US012718129B2

(12) United States Patent
Radin et al.

(10) Patent No.: US 12,718,129 B2
(45) Date of Patent: Aug. 25, 2026

(54) CLASSICALLY-BOOSTED VARIATIONAL QUANTUM EIGENSOLVER

(71) Applicant: Zapata Computing, Inc., Boston, MA (US)

(72) Inventors: Maxwell D. Radin, Cambridge, MA (US); Peter D. Johnson, Portland, ME (US)

(73) Assignee: Zapata Computing, Inc., Boston, MA (US)

( * ) Notice: Subject to any disclaimer, the term of this patent is extended or adjusted under 35 U.S.C. 154(b) by 1065 days.

(21) Appl. No.: 17/686,068

(22) Filed: Mar. 3, 2022

(65) Prior Publication Data

US 2022/0284337 A1 Sep. 8, 2022

Related U.S. Application Data

(60) Provisional application No. 63/197,819, filed on Jun. 7, 2021, provisional application No. 63/157,069, filed on Mar. 5, 2021.

(51) Int. Cl.
*G06N 10/40* (2022.01)
*G06N 5/04* (2023.01)
(Continued)

(52) U.S. Cl.
CPC ............. *G06N 10/40* (2022.01); *G06N 10/20* (2022.01); *G06N 10/60* (2022.01); *G06N 10/80* (2022.01)

(58) Field of Classification Search
None
See application file for complete search history.

(56) References Cited

U.S. PATENT DOCUMENTS

| | | | |
|---|---|---|---|
| 7,353,148 | B1 | 4/2008 | Meyers |
| 10,044,638 | B2 | 8/2018 | Dadashikelayeh |

(Continued)

FOREIGN PATENT DOCUMENTS

| | | | |
|---|---|---|---|
| CA | 3151055 | C | 8/2022 |
| CA | 3133917 | C | 3/2023 |

(Continued)

OTHER PUBLICATIONS

Zhang, et al., Collective Optimization for Variational Quantum Eigensolvers, arXiv:1910.14030v1 [quant-ph], Oct. 30, 2019, pp. 1-9 ( Year: 2019).*

(Continued)

*Primary Examiner* — Wilbert L Starks
(74) *Attorney, Agent, or Firm* — Young Basile Hanlon & MacFarlane P.C.

(57) ABSTRACT

A method and system are provided for estimating ground state and excited state energies of fermionic Hamiltonians using a classically-boosted Variational Quantum Eigensolver (VQE). The disclosed technology overcomes the drawbacks of prior VQE methods, which require large numbers of circuit repetitions and excessive runtimes to achieve precision, especially when implemented using Noisy Intermediate-Scale Quantum NISQ) devices. The disclosed classically-boosted VQE provides an estimation of expectation values using classical methods. The quantum computer is not used to prepare the trial state, but instead uses the difference between the trial state and a classical tractable approximation to the target state. Ground-state energy estimations are provided at an accelerated rate. Also, the measurement reduction of single basis state boosting of conventional VQE, may be estimated using only the overlap between the ground state and the computational basis state used for boosting.

6 Claims, 11 Drawing Sheets

(51) Int. Cl.

| | |
|---|---|
| ***G06N 10/20*** | (2022.01) |
| ***G06N 10/60*** | (2022.01) |
| ***G06N 10/80*** | (2022.01) |

(56) References Cited

U.S. PATENT DOCUMENTS

| | | | |
|---|---|---|---|
| 10,469,087 | B1 | 11/2019 | Granade et al. |
| 10,832,155 | B2 | 11/2020 | Lechner et al. |
| 10,922,460 | B1 | 2/2021 | Lee et al. |
| 10,949,768 | B1 | 3/2021 | Zeng |
| 11,157,827 | B2 | 10/2021 | Sim |
| 11,615,329 | B2 | 3/2023 | Wang et al. |
| 2007/0239366 | A1 | 10/2007 | Hilton |
| 2010/0306142 | A1 | 12/2010 | Amin |
| 2016/0004972 | A1 | 1/2016 | Alboszta et al. |
| 2016/0042294 | A1 | 2/2016 | Macready |
| 2017/0177782 | A1 | 6/2017 | Hastings |
| 2017/0351967 | A1 | 12/2017 | Babbush |
| 2017/0357539 | A1 | 12/2017 | Dadashikelayeh |
| 2017/0364796 | A1 | 12/2017 | Wiebe |
| 2018/0129965 | A1 | 5/2018 | Bocharov |
| 2018/0232649 | A1 | 8/2018 | Wiebe |
| 2018/0246851 | A1 | 8/2018 | Zaribafiyan |
| 2018/0322408 | A1 | 11/2018 | Chen |
| 2019/0164079 | A1 | 5/2019 | Gambetta |
| 2019/0251466 | A1 | 8/2019 | Mezzacapo |
| 2020/0005186 | A1 | 1/2020 | Romero et al. |
| 2020/0097848 | A1 | 3/2020 | Woerner et al. |
| 2020/0117702 | A1 | 4/2020 | Babbush |
| 2020/0151073 | A1 | 5/2020 | Kelly |
| 2020/0274554 | A1 | 8/2020 | Aspuru-Guzik et al. |
| 2020/0334107 | A1 | 10/2020 | Katabarwa |
| 2020/0394549 | A1 | 12/2020 | Dallaire-Demers |
| 2021/0133617 | A1 | 5/2021 | Sim |
| 2021/0182726 | A1 | 6/2021 | Harry Putra |
| 2021/0232963 | A1 | 7/2021 | Gimeno-Segovia et al. |
| 2021/0271731 | A1 | 9/2021 | Stobinska et al. |
| 2021/0312313 | A1 | 10/2021 | Woerner |
| 2022/0188679 | A1 | 6/2022 | Mazzola |
| 2022/0292385 | A1 | 9/2022 | Sauvage |
| 2022/0335325 | A1 | 10/2022 | Dallaire-Demers |
| 2023/0081927 | A1 | 3/2023 | Zhang |

FOREIGN PATENT DOCUMENTS

| | | | |
|---|---|---|---|
| CN | 114223003 | A | 3/2022 |
| EP | 3983961 | A1 | 4/2022 |
| EP | 4022530 | A1 | 7/2022 |
| EP | 4026066 | A1 | 7/2022 |
| EP | 4042338 | A1 | 8/2022 |
| EP | 4052194 | A0 | 9/2022 |
| EP | 4154193 | A1 | 3/2023 |
| JP | 7223174 | B2 | 2/2023 |
| KR | 20160132943 | A | 11/2016 |
| TW | 201723935 | A | 7/2017 |
| TW | 764348 | B | 5/2022 |
| WO | 2015069625 | A1 | 5/2015 |
| WO | 2017001404 | A1 | 1/2017 |
| WO | 2017027185 | A1 | 2/2017 |
| WO | 2018064535 | A1 | 4/2018 |
| WO | 2018212789 | A1 | 11/2018 |
| WO | 2019050555 | A1 | 3/2019 |
| WO | 2019055843 | A1 | 3/2019 |
| WO | 2019104443 | A1 | 6/2019 |
| WO | 2019126644 | A1 | 6/2019 |
| WO | 2019150090 | A1 | 8/2019 |
| WO | 2019220122 | A1 | 11/2019 |
| WO | 2020146794 | A1 | 7/2020 |
| WO | 2020168158 | A1 | 8/2020 |
| WO | 2020214910 | A1 | 10/2020 |
| WO | 2021087206 | A1 | 5/2021 |
| WO | 2022087143 | A1 | 4/2022 |
| WO | 2022187503 | A1 | 9/2022 |
| WO | 2022192525 | A1 | 9/2022 |
| WO | 2023043996 | A1 | 3/2023 |

OTHER PUBLICATIONS

Dumitrescu, E., et al., "Tensor Network Benchmarking for Quantum Computing", Beyond CMOS Computing Workshop: The Interconnect Challenge, Session 1, Talk 4, pp. 1-25 (2017).

Eddins, A., et al., "Doubling the Size of Quantum Simulators by Entanglement Forging," Quantum Physics, arXiv:2104.10220, pp. 1-17 (Apr. 20, 2021).

Endo, S., et al., "Variational quantum algorithms for discovering Hamiltonian spectra", Physical Review A, arXiv preprint arXiv:1806.05707, pp. 1-9 (2018).

Essler, F. H. L., et al., "The one-dimensional Hubbard model", Cambridge University Press, pp. 1-753. (Dec. 11, 2003).

Esslinger, T., "Fermi-Hubbard physics with atoms in an optical lattice", arXiv: 1007.0012v1, pp. 1-29 (Jun. 30, 2010).

Examination Report mailed Dec. 22, 2021, in Canadian patent application No. 3,133,917, 5 pages.

Farhi, E., et al., "A quantum approximate optimization algorithm", Quantum Physics, arXiv:1411.4028v1, pp. 1-16 (Nov. 14, 2014).

Fedorov, A., et al., "Implementation of a Toffoli Gate with Superconducting Circuits", arXiv: 1108.3966v1, pp. 1-5 (Aug. 19, 2011).

Ferrie, C., et al., "How to Best Sample a Periodic Probability Distribution, or on the Accuracy of Hamiltonian Finding Strategies", Quantum Information Processing, arXiv:1110.3067v1, pp. 1-8 (Oct. 13, 2011).

Figgat, C., et al., "Complete 3-Qubit Grover search on a programmable quantum computer", Nature Communications, vol. 8, Article No. 1918, pp. 1-9 (2017).

Finn, C., and Levine, S., "Meta-learning and universality: Deep representations and gradient descent can approximate any learning algorithm," arXiv: 1710.11622, pp. 1-20 (Feb. 14, 2018).

First Office Action mailed May 14, 2021, in Taiwan patent application No. 109139876, 9 pages (English translation Included).

First Office Action mailed Oct. 8, 2021, in Taiwan patent application No. 109137856, 5 pages.

Garcia-Saez, A., et al., "Addressing Hard Classical Problems with Adiabatically Assisted Variational Quantum Eigensolvers", Quantum Physics, arXiv preprint arXiv:1806.02287, pp. 1-7 (2018).

Ge, Y., et al., "Faster Ground State Preparation and High-Precision Ground Energy Estimation with Fewer Qubits," Journal of Mathematical Physics, vol. 60, No. 2,: arXiv:1712.03193, 1-25 (Feb. 2, 2018).

Gentini, L., et al., "Noise-Assisted Variational Hybrid Quantum-Classical Optimization", arXiv:1912.06744, pp. 1-8 (Dec. 13, 2019).

Ghamami, S., and Zhang, B., et al., "Efficient Monte Carlo Counterparty Credit Risk Pricing and Measurement", Journal of Credit Risk, vol. 10, No. 3, pp. 1-42 (Jul. 23, 2014).

Gharibian, S., et al., "Oracle Complexity Classes and Local Measurements on Physical Hamiltonians," In 37th International Symposium on Theoretical Aspects of Computer Science (STACS 2020). Schloss Dagstuhl-Leibniz-Zentrum für Informatik, 2020. arXiv:1909.05981, pp. 1-38 (Sep. 12, 2019).

Gharibian, S., et al., "The complexity of simulating local measurements on quantum systems," Quantum, 3:189, 2019. arXiv:1606.05626, pp. 1-38 (Apr. 7, 2020).

Gilyén, A., et al., "Quantum Singular Value Transformation and Beyond: Exponential Improvements for Quantum Matrix Arithmetics," In Proceedings of the 51st Annual ACM SIGACT Symposium on Theory of Computing, pp. 193-204, 2019. arXiv:1806.01838, Jun. 5, 2018, 67 pages.

Goemans, M.X., et al., "Improved Approximation Algorithms for Maximum Cut and Satisfiability Problems Using Semidefinite Programming", Journal of the Acm (Jacm), vol. 42, No. 6, pp. 1115-1145 (Nov. 1995).

Gokhale, P., and Chong, F.T., "O(N3) Measurement Cost for Variational Quantum Eigensolver on Molecular Hamiltonians", arXiv: 1908.11857v1, pp. 1-5 (Aug. 30, 2019).

Gokhale, P., et al., "Minimizing state preparations in variational quantum eigensolver by partitioning into commuting families", Quantum Physics, arXiv:1907.13623v1, pp. 1-23 (Jul. 31, 2019).

Gonthier, J., et al., "Identifying challenges towards practical quantum advantage through resource estimation: the measurement road-

(56) References Cited

OTHER PUBLICATIONS block in the variational quantum eigensolver," Quantum Physics, arXiv:2012.04001, pp. 1-27 (Dec. 7, 2020).
Grant, E., et al., "An initialization strategy for addressing barren plateaus in parametrized quantum circuits," Quantum 3, 214, pp. 1-9 (Nov. 28, 2019).
Grimsley, H.R., et al., "An adaptive variational algorithm for exact molecular simulations on a quantum computer," Nature Communications 10, 3007, pp. 1-9 (2019).
Grover, L.K., "A fast quantum mechanical algorithm for database search," arXiv preprint quant-ph/9605043, pp. 1-8 (May 1996).
Grover, L.K., "A fast quantum mechanical algorithm for database search", STOC '96: Proceedings of the twenty- eighth annual ACM symposium on Theory of Computing, pp. 1-8 (Jul. 1996).
Handy, N.C., et al., "Size-consistent Brueckner theory limited to double substitutions", Chemical Physics Letters, vol. 164, No. 2-3, pp. 185-192 (Dec. 8, 1989).
Harrow, A. W., et al., "Quantum algorithm for linear systems of equations", Phys. Rev. Lett., vol. 103, No. 15, 1-15 (2009).
He, M., et al., "Quantum Gaussian filter for exploring ground-state properties," arXiv preprint arXiv:2112.06026, pp. 1-7 (Dec. 11, 2021).
Helgaker T. et al., "Molecular Electronic-Structure Theory", Book published by John Wiley & Sons, pp. 1-908 (2000).
Heya, K., et al., "Variational Quantum Gate Optimization", Quantum Physics, arXiv:1810.12745v1, pp. 1-10 (Oct. 30, 2018).
Higgott, O., et al., "Variational Quantum Computation of Excited States," Quantum, vol. 3, pp. 1-11 (Jun. 28, 2019).
Hospedales. T., et al., "Meta-Learning in Neural Networks: A Survey," arXiv e-prints , arXiv:2004.05439, pp. 1-20 (Nov. 7, 2020).
Hoyer, P., et al., "On Arbitrary Phases in Quantum Amplitude Amplification", arXiv:quant-ph/0006031v1, pp. 1-6 (Jun. 7, 2000).
Huang, H., et al., "Near-term quantum algorithms for linear systems of equations," arXiv preprint arXiv: 1909.07344, pp. 1-22 (Dec. 16, 2019).
Huggins, W. J., et al., "Efficient and noise resilient measurements for quantum chemistry on near-term quantum computers", Quantum Physics, arXiv:1907.13117v3, pp. 1-10 (Sep. 23, 2019).
International Search Report & Written Opinion mailed Dec. 11, 2020, in international patent application No. PCT/US2020/049605, 14 pages.
International Search Report & Written Opinion mailed Feb. 18, 2021, in international patent application No. PCT/US2020/058119, 7 pages.
International Search Report & Written Opinion mailed Jan. 5, 2021, in international patent application No. PCT/US2020/052958, 7 pages.
International Search Report & Written Opinion mailed Jul. 27, 2020, in international patent application No. PCT/US2020/028670, 7 pages.
International Search Report & Written Opinion mailed May 11, 2020, in International Patent Application No. PCT/US2020/013181, 11 pages.
International Search Report & Written Opinion mailed Nov. 6, 2020, in international patent application No. PCT/US2020/044615, 8 pages.
International Search Report & Written Opinion mailed Sep. 6, 2021, in international patent application PCT/US2021/033089, 8 pages.
International Search Report and Written Opinion mailed Dec. 6, 2019 in PCT International Patent Application No. PCT/US2019/046895, 9 pages.
International Search Report and Written Opinion mailed Feb. 4, 2022, in International Patent Application No. PCT/US2021/055867, 6 pages.
International Search Report and Written Opinion mailed Mar. 15, 2021, in International Patent Application No. PCT/US2020/061631, 7 pages.
International Search Report and Written Opinion mailed Sep. 21, 2020, in international patent application No. PCT/US2020/037655, pp. 1-8.
Izmaylov, A. F., et al., "Unitary Partitioning Approach to the Measurement Problem in the Variational Quantum Eigensolver Method", Quantum Physics, arXiv: 1907.09040v2, pp. 1-7 (Oct. 18, 2019).
Albash, T., et al., "Adiabatic quantum computation," Rev. Mod. Phys. 90, 015002, pp. 1-71 (2018).
Amaro, D., et al., "Filtering variational quantum algorithms for combinatorial optimization," arXiv preprint arXiv:2106.10055, pp. 1-14 (Feb. 10, 2022).
Ambainis, A., "On physical problems that are slightly more difficult than QMA," In 2014 IEEE 29th Conference on Computational Complexity (CCC), pp. 1-12 (2014).
Andersen, C.K., et al., "Entanglement Stabilization using Parity Detection and Real-Time Feedback in Superconducting Circuits", arXiv:1902.06946v2, pp. 1-12 (Feb. 20, 2019).
Arute, F., et al., "Quantum supremacy using a programmable superconducting processor", Nature, vol. 574, pp. 505-510 (Oct. 23, 2019).
Aspuru-Guzik, A., et al., "Simulated Quantum Computation of Molecular Energies", Science, Quantum Physics, vol. 309, No. 5741, pp. 1-21 (Sep. 9, 2005).
Atia, Y., and Aharonov, D., "Fast-Forwarding of Hamiltonians and Exponentially Precise Measurements," Nature communications, vol. 8, No. 1, pp. 1-9 (Nov. 17, 2017).
Babbush, R., et al., "Encoding Electronic Spectra in Quantum Circuits with Linear T Complexity," Physical Review X, vol. 8, No. 4, 041015, pp. 1-39 (Sep. 19, 2018).
Bach, V., et al., "Generalized Hartree-Fock Theory and the Hubbard Model", Journal of Statistical Physics, vol. 76 (1-2):3-89, pp. 1-68 (Nov. 25, 1993).
Baekkegaard, T., et al., "Realization of efficient quantum gates with a superconducting qubit-qutrit circuit", Scientific Reports, vol. 9, Article No. 13389, pp. 1-10 (Sep. 16, 2019).
Baker, J.M., et al., "Decomposing Quantum Generalized Toffoli with an Arbitrary Number of Ancilla", arXiv: 1904.01671v1, pp. 1-10 (Apr. 2, 2019).
Balu, R., and Borle, A., "Bayesian Networks based Hybrid Quantum-Classical Machine Learning Approach to Elucidate Gene Regulatory Pathways", arXiv:1901.10557v1, pp. 1-9 (Jan. 23, 2019).
Bao, N., et al., "Universal Quantum Computation by Scattering in the Fermi-Hubbard model", arXiv: 1409.3585v2, pp. 1-9 (Sep. 15, 2014).
Barenco, A., et al., "Elementary Gates for Quantum Computation", Physical review A, vol. 52, Issue No. 5, pp. 1-31 (Mar. 23, 1995).
Barenco, A., et al., "Elementary Gates for Quantum Computation", arXiv:quant-ph/9503016v1, Mar. 23, 1995, pp. 1-31.
Barkoutsos, P. K., et al., "Quantum Algorithms for Electronic Structure Calculations: Particle-Hole Hamiltonian and Optimized Wave-Function Expansions," Phys. Rev. A 98, 022322, pp. 1-14 (May 11, 2018).
Bedürftig, G., and Frahm, H., "Spectrum of boundary states in the open Hubbard chain", arXiv:cond-mat.9702227v1, pp. 1-14 (Feb. 26, 1997).
Benedetti, M., et al., "A generative modeling approach for benchmarking and training shallow quantum circuits", arXiv preprint arXiv: 1801.07686v4, pp. 1-16 (Jun. 2, 2019).
Bergholm, V., et al., "Pennylane: Automatic differentiation of hybrid quantum-classical computations," arXiv preprint arXiv: 1811. 04968, pp. 1-15 (Feb. 14, 2020).
Bishop, L., et al., "Quantum Volume", Technical report, IBM T.J. Watson, pp. 1-5 (Mar. 4, 2017).
Bogoljubov, N.N., "A New Method in the Theory of Superconductivity", Soviet Physics JETP, vol. 34, No. 7, pp. 41-46 (Jul. 1958).
Bonet-Monroig, "Comparison of Error itigation Strategies in a Hydrogen Molecule Quantum Simulation", Master hesis. Leiden University, pp. 1-52 (May 29, 2018).
Bonet-Monroig, X., et al., "Nearly optimal measurement scheduling for partial tomography of quantum states", Quantum Physics, arXiv:1908.05628v2, pp. 1-9 (Sep. 6, 2019).

(56) References Cited

OTHER PUBLICATIONS

Bonet-Monroig, X., et al., "Performance comparison of optimization methods on variational quantum algorithms," arXiv preprint arXiv:2111.13454, pp. 1-12 (Dec. 14, 2021).
Bookatz, A. D., et al., "Error Suppression in Hamiltonian Based Quantum Computation Using Energy Penalties", arXiv:1407.1485v1, pp. 1-26 (Jul. 6, 2014).
Brandao, F.G., et al., "For fixed control parameters the quantum approximate optimization algorithm's objective function value concentrates for typical instances," arXiv preprint arXiv:1812.04170, pp. 1-16 (2018).
Brassard, G., et al., "Quantum Amplitude Amplification and Estimation", arXiv:quant-ph/0005055v1, pp. 1-22 (May 15, 2000).
Bravo-Prieto, C., et al., "Variational Quantum Linear Solver," Quantum Physics, arXiv: 1909.05820, pp. 1-21 (Sep. 12, 2019).
Bravyi, L. D., et al., "Fermionic Quantum Computation", Annals of Physics, vol. 298, No. 1, pp. 210-226 (2002).
Bravyi, S., "Lagrangian Representation for Fermionic Linear Optics", arXiv:quant-ph/0404180v2, pp. 1-12 (Sep. 20, 2004).
Broughton, M., et al., "Tensorflow quantum: A software framework for quantum machine learning," arXiv preprint arXiv:2003.02989, pp. 1-56 (Aug. 26, 2021).
Cao, Y., et al., "Implementation of a Toffoli gate using an array of coupled cavities in a single step", Scientific Reports, vol. 8, Article No. 5813, pp. 1-10 (Apr. 11, 2018).
Cao, Y., et al., "Potential of Quantum Computing for Drug Discovery," IBM Journal of Research and Development, vol. 62, Issue 6, p. 6:1-6:20, (Dec. 2018).
Cao, Y., et al., "Quantum Chemistry in the Age of Quantum Computing", Quantum Physics, arXiv: 1812.09976v2, pp. 1-194 (Dec. 28, 2018).
Cerezo, M., et al., "Cost function-dependent barren plateaus in shallow quantum neural networks," arXiv preprint arXiv:2001.00550, pp. 1-39 (Mar. 20, 2021).
Cervera-Lierta, A., et al., "The meta-variational quantum eigensolver (meta-vqe): Learning energy profiles of parameterized hamiltonians for quantum simulation," arXiv:2009.13545, pp. 1-11 (May 28, 2021).
Chakraborty, S., et al., "The Power of Blockencoded Matrix Powers: Improved Regression Techniques via Faster Hamiltonian Simulation," arXiv preprint arXiv:1804.01973, pp. 1-58 (Sep. 3, 2018).
Childs, A. M. et al., "Hamiltonian simulation using linear combinations of unitary operations", Quantum Information and Computation, vol. 12, pp. 901-924 (2012).
Childs, A. M., et al., "Quantum algorithm for systems of linear equations with exponentially improved dependence on precision", arXiv:1511.02306v2, pp. 1-31 (2017).
Chiles, R.A., et al., "An electron pair operator approach to coupled cluster wave functions. application to He2, Be2, and Mg2 and comparison with CEPA methods", The Journal of Chemical Physics, vol. 74, No. 8, pp. 4544-4556 (1981).
Colless, J.I., et al., "Computation of Molecular Spectra on a Quantum Processor with an Error-Resilient Algorithm", Physical Review X, vol. 8, No. 1, pp. 011021-011027 (2018).
Cramer, M., et al., "Efficient Quantum State Tomography", Nature communications, 1(149), pp. 1-7 (Dec. 21, 2010).
Crawford, O., et al., "Efficient quantum measurement of Pauli operators in the presence of finite sampling error", Quantum Physics, arXiv:1908.06942v2, pp. 1-17 (Apr. 21, 2020).
Crooks, G.E., "Performance of the quantum approximate optimization algorithm on the maximum cut problem," arXiv preprint arXiv: 1811.08419, pp. 1-6 (2018).
Dallaire-Demers, P.L., et al., "An application benchmark for fermionic quantum simulations", arXiv:2003.01862v1, pp. 1-14 (Mar. 4, 2020).
Dallaire-Demers, P.L., and Killoran, N., "Quantum generative adversarial networks", arXiv:1804.08641v2, Phys. Rev. A, vol. 98, 012324, pp. 1-10 (Apr. 30, 2018).
Dallaire-Demers, P.L., et al., "Low-depth circuit ansatz for preparing correlated fermionic states on a quantum computer", Quantum Physics, arXiv:1801.01053v1 , pp. 1-15 (Jan. 3, 2018).
Dallaire-Demers, P.L., et al., "Quantum Generative Adversarial Networks," Physical Review A, vol. 98, No. 1, 6.012324, pp. 1-10 (Apr. 30, 2018).
Dallaire-Demers, P.L., et al., "Quantum Generative Adversarial Networks", Quantum Physics, Apr. 30, 2018, pp. 1-10.
Decision of Grant mailed Jan. 20, 2022, in Taiwan patent application No. 109137856, 5 pages.
Andersen, C.K., et al., "Entanglement stabilization using ancilla-based parity detection and real-time feedback in superconducting circuits," npj Quantum Information, vol. 5, No. 1, pp. 1-7 pages. XP055810501, DOI: 10.1038/s41534-019-0185-4 (Dec. 1, 2019).
Azad, U., and Singh, H., "Quantum Chemistry Calculations using Energy Derivatives on Quantum Computers," arXiv:2106.06463v1. pp. 1-12 (Jun. 10, 2021) [retrieved on Jan. 3, 2023]. Retrieved from <URL: https://arxiv.org/pdf/2106.06463.pdf>.
Bækkegaard, T., et al., "Realization of efficient quantum gates with a superconducting qubit-qutrit circuit," arXiv.org, Cornell University Library, 201 Olin Library Cornell University Ithaca, NY 14853, Feb. 12, 2018, 27 pages, XP081554230, DOI: 10.1038/s41598-019-49657-1.
Cai, X., et al., "Quantum computation of molecular response properties," Physical Review Research, pp. 1-7 (Aug. 27, 2020).
Decision to Grant mailed Jan. 17, 2023, in Japanese patent application No. 2021-571623, 5 pages.
Endo, S., et al., "Hybrid Quantum-Classical Algorithms and Quantum Error Mitigation," Journal of the Physical Society of Japan 90, pp. 1-33 (Feb. 1, 2021).
Extended European Search Report mailed Dec. 22, 2022, in European patent application No. 20890215.5, 10 pages.
Extended European Search Report mailed Jan. 12, 2023, in European Patent Application No. 20882002.7, 10 pages.
Extended European Search Report mailed Oct. 27, 2022, in European patent application No. 20868114.8, 10 pages.
First Office Action mailed Dec. 29, 2022, in Canadian patent application No. 3,141,547, 4 pages.
International Search Report and Written Opinion mailed Jan. 5, 2023, in international patent application No. PCT/US2022/043793, 8 pages.
Jansen, K., and Hartung, T., "Zeta-regularized vacuum expectation values from quantum computing simulations," arXiv: 1912.01276v1. pp 1-14. (Dec. 3, 2019) [retrieved on Jan. 3, 2023]. Retrieved from <URL: https://arxiv.org/pdf/1912.01276.pdf>.
Liu, Z., et al., "Some ground-state expectation values for the free parafermion Z(N) spin chain," arXiv:1905.08384v3. pp. 1-17 (Oct. 14, 2019) [retrieved on Jan. 3, 2023]. Retrieved from <URL: https://arxiv.org/pdf/1905.08384.pdf>.
Mcardle, S., et al., "Quantum computational chemistry," arxiv.org, Cornell University Library, 201 Olin Library Cornell University Ithaca, NY 14853, pp. 1-59 XP081585393 (Aug. 30, 2018).
Non-Final Office Action mailed Dec. 6, 2022, in U.S. Appl. No. 16/543,165 of Peter D. Johnson, filed Aug. 16, 2019, 23 pages.
Non-Final Office Action mailed Dec. 8, 2022 for U.S. Appl. No. 16/740,177, of Maxwell D. Radin, filed Jan. 10, 2020, 85 pages.
Notice of Allowance mailed Dec. 22, 2022, in U.S. Appl. No. 16/900,947 of Guoming Wang, filed Jun. 14, 2020, 32 pages.
Notice of Allowance mailed Jan. 19, 2023, in Canadian patent application No. 3,133,917, 1 page.
Notice of Allowance mailed Mar. 30, 2023, in Canadian patent application No. 3,155,085, 1 page.
Pranav Gokhale et al., "Partial Compilation of Variational Algorithms for Noisy Intermediate-Scale Quantum Machines," MICRO-52, Oct. 12-16, 2019, Columbus, OH, USA, 13 pages. XP 58476958A. Available online at <https://doi.org/10.1145.3352460.3358313>.
Ryan Babbush et al., "Low Depth Quantum Simulation of Electronic Structure," Phys. Rev. X 8, 011044 (2018) 37 pages. Available online at <https://arxiv.org/pdf/1706.00023v2.pdf>.
Second Office Action mailed Apr. 6, 2022, in Taiwan patent application No. 109139876, 3 pages (English translation included).
Notice of Allowance mailed May 18, 2022, in Canadian patent application No. 3,151,055, 1 page.
Official Action mailed Sep. 29, 2022, in Canadian patent application No. 3,157,270, 5 pages.

(56) References Cited

OTHER PUBLICATIONS

Anirban Narayan Chowdhury et al., "Improved implementation of reflection operators", researchgate.net, Mar. 6, 2018, 12 pages. Available online at https://www.researchgate.net/publication/323627065_Improved_implementation_of_reflection_operators.
Extended European Search Report mailed Sep. 20, 2022, in European patent application No. 20738886.9, 10 pages.
A. Shabani et al., "Efficient measurement of quantum dynamics via compressive sensing," arxiv.org, Cornell University Library, 201 Olin Library Cornell University Ithaca, NY 14853, Oct. 28, 2009, XP080374481, DOI: 10.1103/PHYSREVLETT.106.100401, 9 pages.
M Mohseni et al., "Quantum Process Tomography: Resource Analysis of Different Strategies," arxiv.org, Cornell University Library, 201 Olin Library Cornell University Ithaca, NY 14853, Feb. 13, 2007, XP080275525, DOI: 10.1103/PHYSREVA.77.032322, 10 pages.
First Examination Report mailed Oct. 28, 2022, in Australian patent application No. 2020292425, 3 pages.
Official Action mailed May 16, 2023, in Canadian patent application No. 3,157,270, 4 pages.
Szabo, A. and Ostlund, N.S., "Modern quantum chemistry: introduction to advanced electronic structure theory," Courier Corporation, 2012. pp . 1-479 (2012).
Takeshita, T., et al., "Increasing the Representation Accuracy of Quantum Simulations of Chemistry without Extra Quantum Resources," Phys. Rev. X, vol. 10, No. 1, pp. 1-9 (Jan. 7, 2020).
Temme, K., et al., "Error Mitigation for Short-Depth Quantum Circuits", Physical review letters, vol. 119, No. 18, 180509, pp. 1-15 (2017).
Torlai, G., et al., "Neural-Network Quantum State Tomography", Nature Physics, vol. 14, No. 5, pp. 1-6 (Feb. 2018).
Tubman, N. M., et al., "Postponing the Orthogonality Catastrophe: Efficient State Preparation for Electronic Structure Simulations on Quantum Devices," Quantum Physics, arXiv: 1809.05523, pp. 1-13, (Sep. 14, 2018).
Urbanek, M., et al., "Chemistry on Quantum Computers with Virtual Quantum Subspace Expansion," Journal of Chemical Theory and Computation 16.9, pp. 5425-5431. doi: 10.1021/acs.jctc.0c00447. (Feb. 28, 2020).
Verdon, G., et al., "Learning to learn with quantum neural networks via classical neural networks," arXiv:1907.05415, pp. 1-12 (Jul. 11, 2019).
Verstraete, F., et al., "Quantum Circuits for Strongly Correlated Quantum Systems", arXiv:0804.1888v1, pp. 1-5 (Apr. 11, 2008).
Verteletskyi, V., et al., "Measurement optimization in the variational quantum eigensolver using a minimum clique cover", Quantum Physics, arXiv:1907.03358v4, pp. 1-7 (Mar. 26, 2020).
Wang, D., et al., "Accelerated Variational Quantum Eigensolver", arXiv:1802.00171v3, pp. 1-11 (Mar. 25, 2019).
Wang, G., et al., "Bayesian Inference with Engineered Likelihood Functions for Robust Amplitude Estimation", arXiv:2006.09350v2, pp. 1-62 (Jun. 26, 2020).
Wang, G., et al., "Minimizing Estimation Runtime on Noisy Quantum Computers," PRX Quantum 2.1 pp. 010346-1-010346-49 (2021).
Watson, J.D., et al., "The complexity of translationally invariant problems beyond ground state energies", arXiv preprint arXiv:2012.12717, pp. 1-58 (Dec. 23, 2020).
Wecker, D., et al., "Solving strongly correlated electron models on a quantum computer", Physical Review A, vol. 92, No. 6, pp. 1-27 (2015).
Wecker, D., et al., "Progress towards practical quantum variational algorithms", Phys. Rev. A 92, 042303, pp. 1-11 (Sep. 8, 2015).
Wecker, D., et al., "Towards Practical Quantum Variational Algorithms", Physical Review A, vol. 92, No. 4, 042303, pp. 1-11 (Sep. 8, 2015).
Wiebe, N., and Granade, C., "Efficient Bayesian Phase Estimation", arXiv:1508.00869v1, pp. 1-12 (Aug. 4, 2015).
Wiebe, N., et al., "Higher Order Decompositions of Ordered Operator Exponentials", Mathematical Physics, arXiv:0812.0562v3, pp. 1-16 (Dec. 4, 2008).
William J. Huggins et al., "Efficient and Noise Resilient Measurements for Quantum Chemistry on Near-Term Quantum Computers," Quantum Physics, arXiv:1907.13117, Jul. 2019, 17 pages.
Willsch, M., et al., "Benchmarking the quantum approximate optimization algorithm," Quantum Information Processing 19, 197, pp. 1-24 (2020).
Wilson, M., et al., "Optimizing quantum heuristics with meta-learning," arXiv:1908.03185, pp. 1-13 (Aug. 8, 2019).
Wootton, J. R., "Benchmarking of quantum processors with random circuits", arXiv: Quantum Physics, arXiv:1806.02736v1, pp. 1-15 (Jun. 7, 2018).
Yen, T., et al., "Measuring all Compatible Operators in One Series of Single-Qubit Measurements Using Unitary Transformations," Journal of Chemical Theory and Computation, vol. 16, No. 4, pp. 1-12 (Mar. 14, 2020.) arXiv:1907.09386.
Yoder, T.J., et al., "Fixed-point quantum search with an optimal number of queries," Physical review letters, vol. 113, No. 21, pp. 210501-210505 (Nov. 21, 2014).
Zhao, A., et al., "Measurement reduction in variational quantum algorithms", Quantum Physics, arXiv:1908.08067v2, pp. 1-21 (Dec. 16, 2019).
Zhou, L., et al., "Quantum approximate optimization algorithm: Performance, mechanism, and implementation on hear-term devices," Phys. Rev. X, vol. 10, pp. 1-23 (2020).
Zhukov, A. A., et al., "Quantum communication protocols as a benchmark for quantum computers", arXiv: 1812.00587v1, pp. 1-25 (Dec. 3, 2018).
Johnson, P. D., et al., "QVECTOR: an algorithm for device-tailored quantum error correction", arXiv preprint arXiv:1711.02249v1, pp. 1-16 (Nov. 7, 2017).
Johnson, P.D., et al., "A Method for Improving Quantum Optimization Algorithms: The Marginals Optimization Procedure", ICE 5th Conference on Quantum Information, Spain, (May 28-31, 2019), Book of Abstracts p. 59.
Jones T., and Benjamin S. C., et al., "Quantum compilation and circuit optimisation via energy dissipation", arXiv:1811.03147, pp. 1-13 (Dec. 19, 2018).
Jordan, P., et al., "In The Collected Works of Eugene Paul Wigner: Part A: The Scientific Papers—Chapter: Über das Paulische Äquivalenzverbot", pp. 109-129. Springer (1993).
Kandala, A., et al., "Hardware-efficient variational quantum eigensolver for small molecules and quantum magnets", Nature 549, pp. 1-24 (Oct. 13, 2017).
Kandala, A., et al., "Hardware-efficient Variational Quantum Eigensolver for Small Molecules and Quantum Magnets", Nature, vol. 549, pp. 1-24 (2017).
Kassal, I., et al., "Polynomial-time quantum algorithm for the simulation of chemical dynamics," Proceedings of the National Academy of Sciences, vol. 105, No. 48, pp. 1-6 (2008).
Kaushal, V., et al., "Shuttling-based trapped-ion quantum information processing", AVS Quantum Science, vol. 2, No. 1, pp. 1-25 (2020).
Kingma, D.P., and Ba, J.L., "Adam: A method for stochastic optimization," arXiv preprint arXiv:1412.6980, pp. 1-15 (2014).
Kirby, W.M., and Love, P.J., "Classical simulation of noncontextual Pauli Hamiltonians," Physical Review A, vol. 102, No. 3, pp. 1-15 (Sep. 24, 2020).
Kirby, W.M., et al., "Contextual Subspace Variational Quantum Eigensolver," Quantum, vol. 5, pp. 1-18 (May 12, 2021).
Kirby, W.M., et al., "Contextuality Test of the Nonclassicality of Variational Quantum Eigensolvers," Physical review letters, vol. 123, No. 20, pp. 1-14 (Feb. 7, 2020).
Kitaev, A.Y., "Quantum Measurements and the Abelian Stabilizer Problem", arXiv preprint quant-ph/9511026, pp. 1-22 (Nov. 20, 1995).
Kitaev, A.Y., et al., "Classical and quantum computation," Graduate Studies in Mathematics, vol. 47, 2002, 24 pages. Editorial Committee: Steven G. Krantz, David Saltman, David Sattinger and Ronald Stern, American Mathematical Society; Providence, Rhode Island, United States of America.
Kivlichan, I. D., et al., "Quantum Simulation of Electronic Structure with Linear Depth and Connectivity", Phys. Rev. Lett. 120, arXiv:1711.04789v2, pp. 1-6 (Mar. 13, 2018).

(56) References Cited

OTHER PUBLICATIONS

Naergaard, M., et al., "Superconducting Qubits: Current State of Play", arXiv:1905.13641v2, pp. 1-28 (Jul. 26, 2019).
Knill, E., et al., "Optimal Quantum Measurements of Expectation Values of Observables," Physical Review A, 7(1), , p. 012328, pp. 1-22 (Jul. 3, 2006).
Knill, E., et al., "Optimal Quantum Measurements of Expectation Values of Observables", arXiv quant-ph/0607019v1, pp. 1-22 (Jul. 3, 2006).
Kottmann, J.S., et al., "Reducing qubit requirements while maintaining numerical precision for the variational quantum eigensolver: A basis-set-free approach," The Journal of Physical Chemistry Letters 12.1, arXiv:2008.02819, pp. 663-673 (2021).
Kottmann, J.S., et al., "Reducing Qubit Requirements while Maintaining Numerical Precision for the Variational Quantum Eigensolver: A Basis-Set-Free Approach," The Journal of Physical Chemistry Letters, vol. 12, No. 1, pp. 1-13 (Dec. 31, 2020).
Krantz, P., et al., "A Quantum Engineer's Guide to Superconducting Qubits", Applied Physics Reviews, vol. 6, No. 2, 021318, pp. 1-59 (2019).
Kuhn, M., et al., "Accuracy and Resource Estimations for Quantum Chemistry on a Near-Term Quantum Computer," Journal of Chemical Theory and Computation 15.9, pp. 1-26. arXiv: 1812.06814 (Aug. 14, 2019).
Kyriienko, O., "Quantum inverse iteration algorithm for programmable quantum simulators," arXiv preprint arXiv: 1901.09988, pp. 1-16 (Sep. 30, 2019).
Lee, S.J.R., et al., "Analytical Gradients for Projection-Based Wavefunction-in-DFT Embedding", arXiv:1903.05830v3, pp. 1-15 (Aug. 19, 2019).
Lemke, C., et al., "Metalearning: a survey of trends and technologies," Artificial Intelligence Review 44, 117 pp. 1-17 (2015).
Li, Z., et al., "Meta-sgd: Learning to learn quickly for few-shot learning," arXiv preprint arXiv:1707.09835, pp. 1-11 (Sep. 28, 2017).
Lieb, E.H., and WU,F.Y., "The one-dimensional Hubbard model: a reminiscence," Physica A: Statistical Mechanics and its Applications 321, 1, arXiv:0207529, pp. 1-33 (2002).
Lin, L, and Tong, Y., "Heisenberg-limited ground state energy estimation for early fault-tolerant quantum computers," arXiv preprint arXiv:2102.11340, pp. 1-24 (Feb. 22, 2021).
Lin, L, and Tong, Y., "Near-optimal ground state preparation," Quantum, 4:372,arXiv:2002.12508, pp. 1-22 (Dec. 6, 2020).
Liu, J., and Wang, L., "Differentiable learning of quantum circuit Born machines", Phys. Rev. A 98, 062324, pp. 1-9 (2018).
Liu, Y., "The Complexity of the Consistency and N-Representability Problems for Quantum States", Quantum Physics, arXiv preprint arXiv:0712.3041, pp. 1-89 (2007).
Liu, Y., et al., "Quantum computational complexity of the N-representability problem: QMA complete", Physical review letters, vol. 98, No. 11, pp. 1-6 (2007).
Long, G.L., et al., "Phase Matching in Quantum Searching", arXiv:quant-ph/9906020v1, pp. 1-13 (Jun. 5, 1999).
Low, G.H., and Chuang, I.L., "Optimal Hamiltonian Simulation by Quantum Signal Processing", arXiv: 1606.02685v2, pp. 1-6 (Dec. 20, 2016).
Low, G.H., et al., "Methodology of Resonant Equiangular Composite Quantum Gates", Physical Review X, vol. 6, No. 4, pp. 1-13 (2016).
Manby, F.R., et al., "A simple, exact density-functional-theory embedding scheme", Journal of Chemical Theory and Computation, 8 (8), pp. 2564-2568 (Jul. 17, 2012).
Manrique, D.Z., et al., "Momentum-Space Unitary Coupled Cluster and Translational Quantum Subspace Expansion for Periodic Systems on Quantum Computers," arXiv: 2008.08694 [quant-ph], pp. 1-31 (2021).
Mari, A., et al., "Estimating the gradient and higher order derivatives on quantum hardware," Phys. Rev. A 103, 012405, pp. 1-17 (Feb. 26, 2021).
Maslov, D., "Basic Circuit Compilation Techniques for an Ion-Trap Quantum Machine", https://arxiv.org/pdf/1603.07678v4, pp. 1-18 (Feb. 21, 2017).
Mcardle, S., et al., "Digital quantum simulation of molecular vibrations," Chemical science, 10(22):5725-5735, 2019. arXiv:1811.04069, pp. 1-14 (Jan. 23, 2020).
Mcardle, S., et al., "Variational ansatz-based quantum simulation of imaginary time evolution," Nature Partner Journals: Quantum Information, vol. 5, No. 1, pp. 1-6 (2019).
Mcclean, J. R., et al., "The theory of variational hybrid quantum-classical algorithms", New Journal of Physics, vol. 18, pp. 1-22 (Feb. 5, 2016).
McClean, J.R., et al., "Barren plateaus in quantum neural network training landscapes," Nature communications, arXiv: 1803.11173, pp. 1-6 (2018).
Mcclean, J.R., et al., "Decoding quantum errors with subspace expansions," Nat. Comm. 11, p. 636. doi: 10.1038/s41467-020-14341—pp. 1-9 (2020).
Mcclean, J.R., et al., "Hybrid Quantum-Classical Hierarchy for Mitigation of Decoherence and Determination of Excited States", Physical Review A, vol. 95, No. 4, pp. 1-10 (2017).
Mcclean, J.R., et al., "OpenFermion: the electronic structure package for quantum computers", Quantum Science and Technology 5.3, p. 034014, pp. 1-22 (2020).
Mcclean, J.R., et al., "The theory of variational hybrid quantum-classical algorithms," New Journal of Physics, vol. 18, No. 2, arXiv:1509.04279, pp. 1-20 (Sep. 14, 2015).
Meir, Y., and Wingreen., "Landauer formula for the current through an interacting electron region," Physical review etters, vol. 68, No. 16, pp. 2512-2516, (Apr. 20, 1992).
Michielsen, K., et al., "Benchmarking gate-based quantum computers", Quantum Physics, arXiv:1706.04341, vol. 220 pp. 1-33 (Jun. 14, 2017).
Mølmer, K., and Sørensen, A., "Multiparticle entanglement of hot trapped ions", arXiv:quant-ph/9810040v2, pp. 1-4 (Jan. 26, 1999).
Mostafa H., and Wang X., et al., "Parameter Efficient Training of Deep Convolutional Neural Networks by Dynamic Sparse Reparameterization", arXiv:1902.05967v3, pp. 1-18 (May 13, 2019).
Motta, M., et al., "Determining eigenstates and thermal states on a quantum computer using quantum imaginary time evolution," Nature Physics, vol. 16, No. 2, pp. 1-18 (Feb. 16, 2020).
Motta, M., et al., "Low rank representations for quantum simulation of electronic structure", Computational Physics, Quantum Physics, arXiv:1808.02625v2, pp. 1-8 (Aug. 9, 2018).
Nakanishi, K.M., et al., "Subspace-search variational quantum eigensolver for excited states," Phys. Rev. Research 1, p. 033062. doi: 10.1103/PhysRevResearch. 1.033062-1-7 (Oct. 3, 2019).
Nelder, J. A., and Mead, R., "A simplex method for function minimization", The Computer Journal, vol. 7, Issue. 4, pp. 308-313 (Jan. 1965).
Nichol, A., et al., "On first-order metal-earning algorithms," arXiv:1803.02999, pp. 1-15 (Oct. 22, 2018).
Nielsen, M. A., and Chuang, I. L., "Quantum Computation and Quantum Information", Cambridge University Press, pp. 1-704 (2000).
Nielsen, M.A., et al, "Quantum Computation as Geometry", arXiv:quant-ph/0603161v2, pp. 1-13 (Mar. 21, 2006).
Non-Final Office Action mailed Jun. 10, 2021, in U.S. Appl. No. 17/084,990 of Sukin Sim, filed Oct. 30, 2020, 20 pages.
Notice of Allowance mailed Aug. 12, 2021, in U.S. Appl. No. 17/084,990 of Sukin Sim, filed Oct. 30, 2020, 5 pages.
Notice of Allowance mailed Aug. 27, 2021, in U.S. Appl. No. 17/084,990 of Sukin Sim, filed Oct. 30, 2020, 5 pages.
Notice of Allowance mailed Jun. 28, 2021, for U.S. Appl. No. 17/033,727 of Pierre-Luc Dallaire-Demers, filed Sep. 26, 2020, 32 pages.
O'brien, T. E., et al., "Calculating energy derivatives for quantum chemistry on a quantum computer," NPJ Quantum Information, vol. 5, No. 1, pp. 1-12 (2019).
O'gorman, B., et al., Generalized swap networks for near-term quantum computing, arXiv: 1905.05118 [quant-ph]., pp. 1-16 (May 13, 2019).

(56) References Cited

OTHER PUBLICATIONS

Parrish, R.M., et al., "Quantum Computation of Electronic Transitions Using a Variational Quantum Eigensolver," Physical Review Letters, vol. 122, No. 23, pp. 1-13 (Apr. 10, 2019).
Peruzzo, A., et al., "A variational eigenvalue solver on a photonic quantum processor", Nature Communications, vol. 5, Article No. 4213, pp. 1-7 (2014).
Peruzzo, A., et al., "A variational eigenvalue solver on a quantum processor", Quantum Physics, arXiv:1304.3061v1, pp. 1-10 (Apr. 10, 2013).
Pino, J.M., et al., "Demonstration of the QCCD trapped-ion quantum computer architecture", arXiv:2003.01293, pp. 1-11 (Sep. 26, 2020).
Potthoff, M., "Chapter 1: Self-energy-functional theory", arXiv:1108.2183, pp. 1-38 (Aug. 10, 2011).
Poulin, D., and Wocjan, P., "Preparing ground states of quantum many-body systems on a quantum computer," Physical review letters, vol. 102, No. 13, 130503, pp. 1-7 (Sep. 16, 2008).
Powell, M. J. D., "A Direct Search Optimization Method That Models the Objective and Constraint Functions by Linear Interpolation", In: Gomez S., Hennart JP. (eds) Advances in Optimization and Numerical Analysis. Mathematics and Its Applications, vol. 275. Springer, Dordrecht, pp. 51-52 (1994).
Purvis, G.D., et al., "A full coupled-cluster singles and doubles model: The inclusion of disconnected triples", The Journal of Chemical Physics, vol. 76, No. 4, pp. 1910-1918 (Feb. 15, 1982).
R. L. Fox et al., "Rates of change of eigenvalues and eigenvectors," AIAA Journal 6.12 (1968), pp. 2426-2429.
Reiher, M., et al., "Elucidating Reaction Mechanisms on Quantum Computers", PNAS, vol. 114, No. 29, pp. 1-28 (2016).
Rice, J.E., et al., "Quantum computation of dominant products in lithium-sulfur batteries," The Journal of Chemical Physics, 154(13): 134115, 2021. arxiv2001.01120, pp. 1-7 (Jan. 4, 2020).
Robbins, K., and Love, P.J., "Benchmarking VQE with the LMG model," arXiv: 2105.06761 [quant-ph]. pp. 1-15 (Aug. 2, 2021).
Robert M. Parrish et al., "Psi4 1.1: An Open-Source Electronic Structure Program Emphasizing Automation, Advanced Libraries, and Interoperability," J. Chem. Theory Comput. 13.7 (2017), pp. 3185-3197. doi: 10.1021/acs.jctc.7b00174. url: http://dx.doi.org/10.1021/acs.jctc.7b00174.
Rodriguez-Lujan, I., et al., "Quadratic Programming Feature Selection", The Journal of Machine Learning Research, vol. 11, pp. 1491-1516 (2010).
Romero et al., "Quantum autoencoders for efficient compression of quantum data", arXiv:1612.02806v2, Feb. 10, 2017, 11 pages. . [retrieved on Jan. 20, 2020]. Retrieved from <https://arxiv.org/abs/1612.02806>.
Romero, J., and Aspuru-Guzik, A., "Variational quantum generators: Generative adversarial quantum machine earning for continuous distributions", Quantum Physics, arXiv:1901.00848 [quant-ph], pp. 1-15 (Jan. 3, 2019).
Romero, J., et al., "Quantum autoencoders for efficient compression of quantum data", Quantum Science and Technology, vol. 2 (4):045001, Feb. 10, 2017, pp. 1-10.
Romero, J., et al., "Strategies for quantum computing molecular energies using the unitary coupled cluster ansatz", arXiv: 1701.02691v2 [quant-ph], vol. 4, No. 4, pp. 1-18 (Feb. 10, 2018).
Rubin, N. C., et al., "Application of Fermionic Marginal Constraints to Hybrid Quantum Algorithms", New Journal of Physics, vol. 20, No. 5, 053020, pp. 1-21 (2018).
Rubin, N.C., "A Hybrid Classical/Quantum Approach for Large-Scale Studies of Quantum Systems with Density Matrix Embedding Theory", Quantum Physics, arXiv: 1610.06910 [quant-ph], pp. 1-10, (2016).
Rusu, A. A., et al., "Meta-learning with latent embedding optimization," arXiv:1807.05960, pp. 1-17 (Mar. 26, 2019).
Sarma, S.D., et al., "Majorana Zero Modes and Topological Quantum Computation", arXiv: 1501.02813v2, pp. 1-16, May 14, 2015 (retrieved on Nov. 17, 2019). Retrieved from <https://arxiv.org/abs/1501.02813>.
Schlittgen, B., et al., "Low-Energy Effective Theories of Quantum Spin and Quantum Link Models", Physical Review D, vol. 63. No. 8, pp. 1-29 (Mar. 19, 2001).
Schuch, N. and Verstraete, F., "Computational Complexity of interacting electrons and fundamental limitations of Density Functional Theory", Nature Physics, DOI: 10.1038/NPHYS1370, pp. 732-735 (Aug. 23, 2009).
Schuld, M., et al., "Circuit-centric quantum classifiers", arXiv:1804.00633v1, pp. 1-17 (Apr. 2, 2018).
Seeley, J.T., et al., "The Bravyi-Kitaev transformation for quantum computation of electronic structure," The Journal of chemical physics, 137(22):224109, 2012. arXiv: 1208.5986, pp. 1-38 (Aug. 29, 2012).
Sepiol, M.A., "A High-Fidelity Microwave Driven Two-Qubit Quantum Logic Gate in 43Ca+", pp. 1-197 (2016).
Sergeevich, A., et al., "Characterization of a Qubit Hamiltonian Using Adaptive Measurements in a Fixed Basis", arXiv: 1102.3700v2, pp. 1-6 (Nov. 23, 2011).
Sim, S., et al., "Adaptive pruning-based optimization of parameterized quantum circuits," Quantum Science and Technology 10.1088/2058-9565/abe107 (2021) pp. 1-24, arXiv:2010.00629.
Skolik, A., et al., "Layerwise learning for quantum neural networks," arXiv:2006.14904, vol. 3, No. 5 pp. 1-11 (Jun. 26, 2020).
Somma, R. D., "Quantum eigenvalue estimation via time series analysis," New Journal of Physics, 21(12):123025, 2019. arXiv:1907.11748, pp. 1-10 (Sep. 4, 2020).
Somma, R. D., et al., "Spectral gap amplification," SIAM Journal on Computing, 42(2):593-610, 2013. arXiv:1110.2494, Mar. 30, 2012, 14 pages.
Steane, A., "Multiple Particle Interference and Quantum Error Correction", Proceedings of the Royal Society A, The royal Society, vol. 452, Issue. 1954, pp. 2551-2577 (Nov. 8, 1996).
Subasi, Y., et al., "Quantum algorithms for systems of linear equations inspired by adiabatic quantum computing," Physical review letters, vol. 122, No. 6, pp. 1-9 (Nov. 29, 2018).
Sunkin Sim et al., "Expressibility and Entangling Capability of Parameterized Quantum Circuits for Hybrid Quantum-Classical Algorithms", arXiv: 1905.10876v1, May 25, 2019, 18 pages. Available online at <URL: https://arxiv.org/abs/1905.10876v1.pdf>.
Swarnadeep Majumder et al., "Real-time calibration with spectator qubits", npj Quantum Information, vol. 6, Retrieved from: <URL: https://www.nature.com/articles/s41534-020-0251-y>, Feb. 7, 2020, 9 pages.
"Quantum Computing: Progress and Prospects" National Academies of Sciences, Engineering, and Medicine, pp. 1-273 (2019).
Benedetti, M., et al., "Parameterized quantum circuits as machine learning models," arXiv: 1906.07682v2, pp. 1-18 (Oct. 10, 2019). Available online at <https://arxiv.org/abs/1906.07682v2>.
Colless, J.I., et al., "Robust determination of molecular spectra on a quantum processor," arxiv.org. Cornell University Library, 201 Olin Library Cornell University Ithaca, NY 14853, XP081278642, DOI: 10.1103/physrevx.8.011021, pp. 1-12 (Jul. 20, 2017).
Dyakonov, M., "The case against Quantum Computing", IEEE Spectrum, pp. 1-5 (Nov. 15, 2018).
Endo, S., et al., "Hybrid quantum-classical algorithms and quantum error mitigation," arXiv.2011.01382v1, pp. 1-39 (Nov. 2, 2020) Available online at [https://arxiv.org/abs/2011.01382].
Extended European Search Report mailed Jun. 22, 2022, in European patent application No. 20791186.8, 8 pages.
Extended European Search Report mailed May 19, 2022, in European patent application No. 19850377.3, 10 pages.
Hempel, C. et al., "Quantum chemistry calculations on a trapped-ion quantum simulator," arxiv.org. Cornell University ibrary, 201 Olin Library Cornell University Ithaca, NY 14853, XP080859698, pp. 1-21 (Mar. 27, 2018).
Horgan, J., "Will Quantum Computing Ever Live Up to Its Hype?", Quantum Computing, Scientific American, pp. 6 (Apr. 20, 2021).
Huang, C., et al., "Classical Simulation of Quantum Supremacy Circuits," arXiv:2005.06787v1., pp. 1-28 (May 14, 2020) Available online at [https://arxiv.org/abs/2005.06787].
International Search Report & Written Opinion mailed Jun. 15, 2022, in international patent application No. PCT/US2022/018727, 9 pages.

(56) References Cited

OTHER PUBLICATIONS

International Search Report & Written Opinion mailed Jun. 28, 2022, in international patent application No. PCT/US2022/019724, 9 pages.

Johnson, P.D., et al., "QVECTOR: an algorithm for device-tailored quantum error correction," pp. 1-16, XP055553548, (Nov. 7, 2017) Retrieved from the Internet at <URL:https://arxiv.org/pdf/1711.02249.pdf.

Moll, N., et al., "Quantum optimization using variational algorithms on near-term quantum devices," Quantum Science and Technology, vol. 3, pp. 18 (Jun. 19, 2018) [retrieved on Nov. 25, 2019]. Retrieved from <https://iopscience.iop.org/article/10.1088/2058-9565/aab822/pdf>.

Non-Final Office Action mailed May 11, 2022, in U.S. Appl. No. 16/543,165 of Peter D. Johnson, filed Aug. 16, 2019, 26 pages.

Preskill, J., "Quantum Computing in the NISQ era and beyond", pp. 1-20 (Jul. 31, 2018).

Sauvage, F., et al., "FLIP: A flexible initializer for arbitrarily-sized parametrized quantum circuits," https://arxiv.org/abs/2103.08572v2, 15 pages, (May 5, 2021).

Xia, R., and Kais, S., "Hybrid Quantum-Classical Neural Network for Calculating Ground State Energies of Molecules," Entropy, vol. 22, No. 8, pp. 1-12 (Jul. 29, 2020) Available online at [https://doi.org/10.3390/e22080828].

Decision to Grant mailed Jul. 19, 2022, in Taiwan patent application No. 109139876, 5 pages.

Examination Report mailed Aug. 24, 2022, in Canadian patent application No. 3, 155,085, 4 pages.

Final Office Action mailed Aug. 25, 2022, in U.S. Appl. No. 16/543,165 of Peter D. Johnson, filed Aug. 16, 2019, 73 pages.

Frank Jensen, "Introduction to computational chemistry," John Wiley & Sons, Great Britain, 2017, 620 pages.

Non-Final Office Action mailed Aug. 3, 2022, in U.S. Appl. No. 16/900,947 of Guoming Wang, filed Jun. 14, 2020, 82 pages.

Second Examination Report mailed Aug. 2, 2022, in Canadian patent application No. 3,133,917, 3 pages.

* cited by examiner

| Molecule | Number of qubits | Overlap | Measurements | | Speedup |
|---|---|---|---|---|---|
| | | | Conventional VQE | HF-VQE | |
| $H_2$ | 4 | 0.9997 | $3.1 \times 10^3$ | 3.2 | 970 |
| | 8 | 0.9984 | $1.9 \times 10^5$ | $3.9 \times 10^2$ | 490 |
| | 12 | 0.9945 | $2.7 \times 10^6$ | $1.4 \times 10^4$ | 190 |
| | 16 | 0.9944 | $1.7 \times 10^7$ | $2.9 \times 10^4$ | 570 |
| $Li_2$ | 4 | 0.9975 | $1.2 \times 10^3$ | 6.4 | 190 |
| | 8 | 0.9934 | $7.2 \times 10^3$ | $2.5 \times 10^2$ | 29 |
| | 12 | 0.9928 | $2.1 \times 10^5$ | $7.6 \times 10^2$ | 280 |
| | 16 | 0.9870 | $1.4 \times 10^6$ | $6.0 \times 10^3$ | 230 |
| $N_2$ | 12 | 0.9287 | $1.3 \times 10^7$ | $3.2 \times 10^6$ | 4.1 |
| | 16 | 0.9287 | $2.6 \times 10^7$ | $4.1 \times 10^6$ | 6.3 |
| $F_2$ | 16 | 0.9737 | $1.7 \times 10^8$ | $1.0 \times 10^6$ | 170 |

FIG. 7

CLASSICALLY-BOOSTED VARIATIONAL QUANTUM EIGENSOLVER

BACKGROUND

Field of the Technology Disclosed

The disclosed technology relates to a method for estimating ground state and excited state molecular energies using classical-boosting and VQE Hamiltonian methods.

Description of Related Art

The subject matter discussed in this section should not be assumed to be prior art merely as a result of its mention in this section. Similarly, any problems or shortcomings mentioned in this section or associated with the subject matter provided as background should not be assumed to have been previously recognized in the prior art. The subject matter in this section merely represents different approaches, which in and of themselves can also correspond to implementations of the claimed technology.

In quantum chemistry, the problem of determining properties of molecules and materials lies within the electronic structure of molecules. The quantum mechanical eigenstate energies and wave functions of the electrons in a molecular system are essential for understanding and predicting industry-relevant quantities, including reaction rates, binding energies, and molecular pathways. In particular, the ground state energy as a function of the nuclear coordinates (the ground state energy manifold) of a molecular system is sufficient for determining many of these properties. The standard approach requires first preparing the quantum computer in the desired quantum state (an approximation of the ground state of a molecular system) and then extracting the ground state energy using the quantum phase estimation algorithm (QPEA).

Using near-term quantum computers for estimating the ground and excited state energies of fermionic Hamiltonians is generally based on the Variational Quantum Eigensolver (VQE). This method, however has drawbacks. Despite great interest in VQE, its utility is limited by the error introduced by device noise as well as the large number of circuit repetitions and excessive run time required to achieve sufficient precision in energy estimation. Error from device noise is compounded by the large numbers of gates required by useful problem instances. Recent studies have found that VQE, as it is conventionally formulated, would be unlikely to yield an advantage in run time over classical algorithms for typical computational chemistry problems. While contextual subspace VQE uses VQE to augment a classical energy estimate, the classical estimate is derived from a non-contextual approximation to the Hamiltonian rather than electronic structure methods commonly used in computational chemistry. The disclosed technology overcomes these drawbacks.

SUMMARY

The disclosed technology provides a method of reliable estimation of ground and excited state energies using “classical-boosting” combined with VQE Hamiltonian decomposition techniques. Unlike existing VQE approaches, the sensitivity to sampling error and device noise approaches zero in the limit where the classically tractable states are able to describe an eigenstate. The disclosed technology uses a generalized VQE method to consider wavefunctions in a subspace spanned by classically tractable states on a classical computer and states that can be prepared on a quantum computer.

In one aspect, the measurement requirements are greatly reduced in the simplest case, where a single computational basis state is used to boost conventional VQE. By using this method, the ground-state energy estimation of several closed-shell homonuclear diatomic molecules can be accelerated by a factor of approximately 10-1000. The measurement reduction of such single basis state boosting, relative to conventional VQE, can be estimated using only the overlap between the ground state and the computational basis state used for boosting.

The ground and excited state energies can be estimated using classical-boosting, which is advantageously combined with VQE Hamiltonian decomposition techniques. Unlike existing VQE approaches, the sensitivity to sampling error and device noise approaches zero in the limit where the classically tractable states are able to describe an eigenstate.

The disclosed technology is a classically-boosted VQE (or CB-VQE), a generalization of VQE that allows a reduction of the fidelity and measurement requirements by advantageously using classical approximate solutions to an electronic structure problem.

In one embodiment, the subspace is spanned by a set of states, where some are classically tractable on a classical computer and others may be prepared on a quantum computer.

In one aspect, the sensitivity of estimated eigenvalues to device and sampling error can vanish in the limit that the classically tractable states approach the exact solution. In the simplest version of classical boosting, where a single Slater determinant is used to boost conventional VQE, the number of measurements needed to estimate the ground-state energy of diatomic molecules is reduced by several orders of magnitude. The speedup may be expressed in terms of the overlap between the exact ground state and the Slater determinant used for boosting, so that single-determinant classical boosting may be applied to larger systems.

In one embodiment of the disclosed technology, a method is performed on a hybrid quantum-classical computer system for computing the ground state energy of a Hamiltonian, the computer system comprising a classical computer and a quantum computer. The classical computer includes a processor, a non-transitory computer-readable medium, and computer instructions stored in the non-transitory computer-readable medium. The quantum computer includes a quantum component, having a plurality of qubits, which accepts a sequence of instructions to evolve a quantum state based on a series of quantum gates. In one aspect, computer instructions, when executed by the processor, perform a method for computing, on the hybrid quantum-classical computer, the ground state of a Hamiltonian.

The first step of the method generates, on the classical computer, a set of initial parameters representing a parametrized trial state. The second step of the method prepares, on the quantum computer, a quantum circuit corresponding to the parametrized initial trial state on the quantum computer. The quantum circuit is run on the quantum computer using the initial parameters. The result of running the quantum circuit is measured. The classical computer then calculates a cost function. A plurality of N iterations are performed (e.g., on the classical computer), each of which comprises: (1) minimizing the cost function using a using a classical optimizer routine; and (2) updating the set of initial parameters using the classical optimizer routine; until predetermined convergence is reached to approximate the ground state energy of the Hamiltonian.

The iterations of the classical optimizer routine may be minimized to achieve a predetermined balance between the iterations of the classical optimizer routine and a desired precision of the ground state energy approximation of the Hamiltonian. The classical optimizer routine may be a unitary coupled cluster ansatz (UCC).

The set of initial parameters may represent a difference between a parametrized trial state and a classical tractable approximation to a target state. The classically tractable approximation may be a single Slater determinant.

Generating the set of initial parameters may be based on a relationship between the number N of iterations and a desired precision of the approximation of the ground state of the Hamiltonian. Generating the initial set of parameters may include generating the initial set of parameters so that the initial set of parameters does not contain a computational basis state. Generating the set of initial parameters may use the Hartree-Fock method. The Jordan-Wigner transformation may be used to generate the set of initial parameters on the classical computer.

In another embodiment, the disclosed technology may be implemented as a hybrid quantum-classical computer system for computing the ground state energy of a Hamiltonian. The hybrid quantum-classical computer system includes a classical computer and a quantum computer. The classical computer includes a processor, a non-transitory computer-readable medium, and computer instructions stored in the non-transitory computer-readable medium. The quantum computer includes a quantum component, having a plurality of qubits, which accepts a sequence of instructions to evolve a quantum state based on a series of quantum gate. In operation, the computer instructions, when executed by the processor, perform a method for computing, on the hybrid quantum-classical computer, the ground state of a Hamiltonian.

The first step of the method generates, on the classical computer, a set of initial parameters representing a parametrized trial state. The second step of the method prepares, on the quantum computer, a quantum circuit corresponding to the parametrized initial trial state on the quantum computer. The quantum circuit is run on the quantum computer using the initial parameters. The result of running the quantum circuit is measured. The classical computer then calculates a cost function. A plurality of N iterations are performed (e.g., on the classical computer), each of which comprises: (1) minimizing the cost function using a using a classical optimizer routine; and (2) updating the set of initial parameters using the classical optimizer routine; until predetermined convergence is reached to approximate the ground state energy of the Hamiltonian.

The iterations of the classical optimizer routine may be minimized to achieve a predetermined balance between the iterations of the classical optimizer routine and a desired precision of the ground state energy approximation of the Hamiltonian. The classical optimizer routine may be a unitary coupled cluster ansatz (UCC).

The set of initial parameters may represent a difference between a parametrized trial state and a classical tractable approximation to a target state. The classically tractable approximation may be a single Slater determinant.

Generating the set of initial parameters may be based on a relationship between the number N of iterations and a desired precision of the approximation of the ground state of the Hamiltonian. Generating the initial set of parameters may include generating the initial set of parameters so that the initial set of parameters does not contain a computational basis state. Generating the set of initial parameters may use the Hartree-Fock method. The Jordan-Wigner transformation may be used to generate the set of initial parameters on the classical computer.

BRIEF DESCRIPTION OF THE DRAWINGS

The disclosed technology, as well as a preferred mode of use and further objectives and advantages thereof, will best be understood by reference to the following detailed description of illustrative embodiments when read in conjunction with the accompanying drawings. In the drawings, like reference characters generally refer to like parts throughout the different views. The drawings are not necessarily to scale, with an emphasis instead generally being placed upon illustrating the principles of the technology disclosed.

FIG. 7 illustrates, in table form, the speedup provided by the disclosed technology using classical boosting numerical calculations of measurement requirements of HF-VQE shown alongside conventional VQE for closed-shell homonuclear diatomic molecules;

DETAILED DESCRIPTION

Overview

Figure 4:
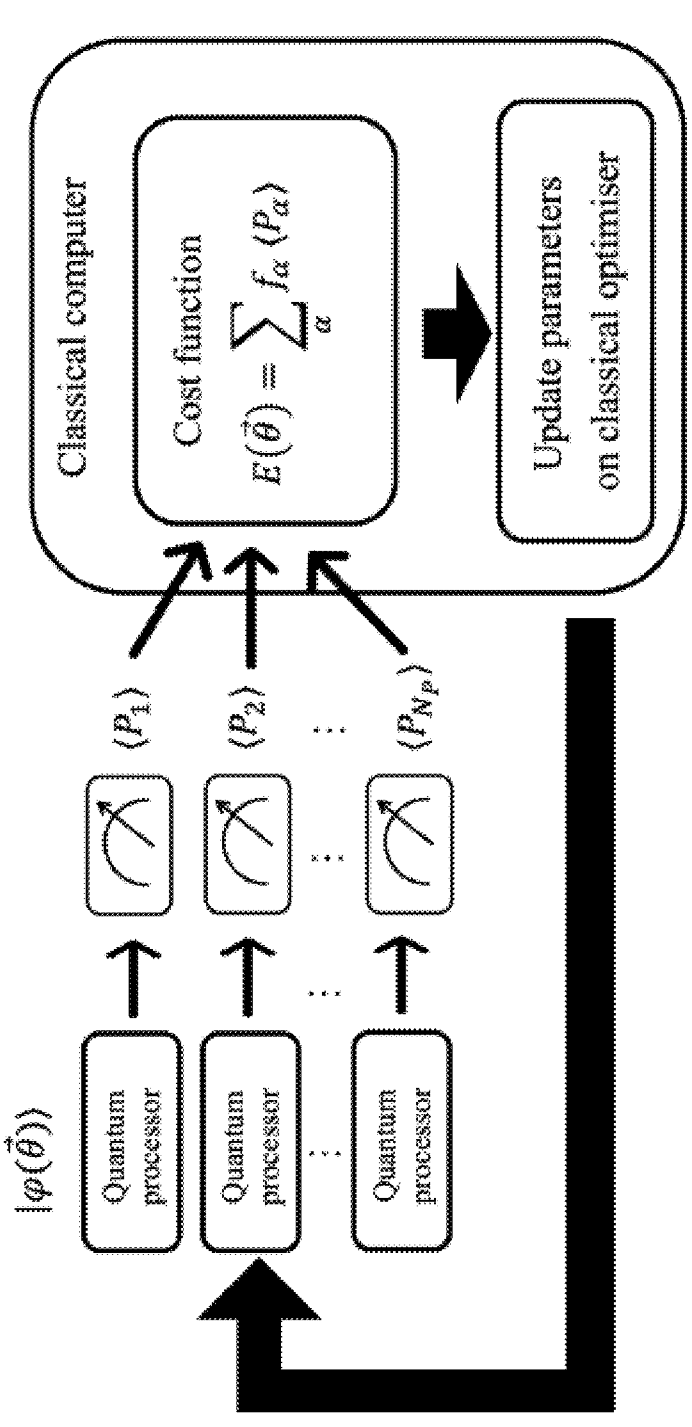
FIG. 4 is a simplified schematic illustration of a variational quantum algorithm according to one embodiment of the present invention.

Turning initially to FIG. 4, a simplified conventional variational eigensolver (VQE) is shown. The Variational Quantum Eigensolver (VQE) is a hybrid quantum-classical algorithm with the purpose of finding an upper bound of the lowest eigenvalue of a given Hamiltonian. The VQE algorithm runs partly on a classical computer and partly on a quantum computer to provide an approximate solution to a given optimization problem.

The Variational Quantum Eigensolver (VQE) is currently used for providing solutions in quantum chemistry using near-term quantum computers, although drawbacks exist, as discussed above, such as susceptibility to noise and excessive run times.

A quantum computer is trained to prepare the ground state of a given molecule. The inputs to the VQE algorithm are a molecular Hamiltonian and a parametrized circuit preparing the quantum state of the molecule. The first step of any quantum algorithm is the preparation of an initial or trial (ansatz) state. The success of an algorithm for determining ground state energy depends on the quality of the state preparation. The ansatz for the preparation comes from a classical approximation for a ground state of a given Hamiltonian. Such a state generally must have two properties. The expectation values of the Pauli operators ($P_1$, $P_2$, $P_{Np}$) are measured for the ansatz state, and the expectation value of the Hamiltonian is measured as a cost function on the classical computer. The cost function is sent to the classical optimizer to update the parameters.

First, the ansatz needs to a have a significant overlap with the ground state. Second, the state must be efficiently preparable on a quantum computer. Examples of state preparation include the Hartree-Fock (HF) state, states from coupled-cluster methods, or states obtained using the method of adiabatic quantum evolution.

Within VQE, the cost function is defined as the expectation value of the Hamiltonian computed in the trial state. The ground state of the target Hamiltonian is obtained by performing an iterative minimization of the cost function. The optimization is carried out by a classical optimizer which leverages a quantum computer to evaluate the cost function and calculate its gradient at each optimization step.

Quantum computers are particularly useful when classical methods cannot provide answers with high accuracy, such as for strongly correlated systems. Generalized subspace expansion may be defined as the use of a quantum computer to find the minimum energy within a subspace spanned by states $\{|\Phi_\alpha\rangle\}$. A sensitivity analysis explores the behavior when some of the states in this set are classically tractable. In the regime where the classically tractable states provide a good approximation of an eigenstate, the sensitivity to errors in quantum estimation is found to vanish under reasonable assumptions.

Figure 5:
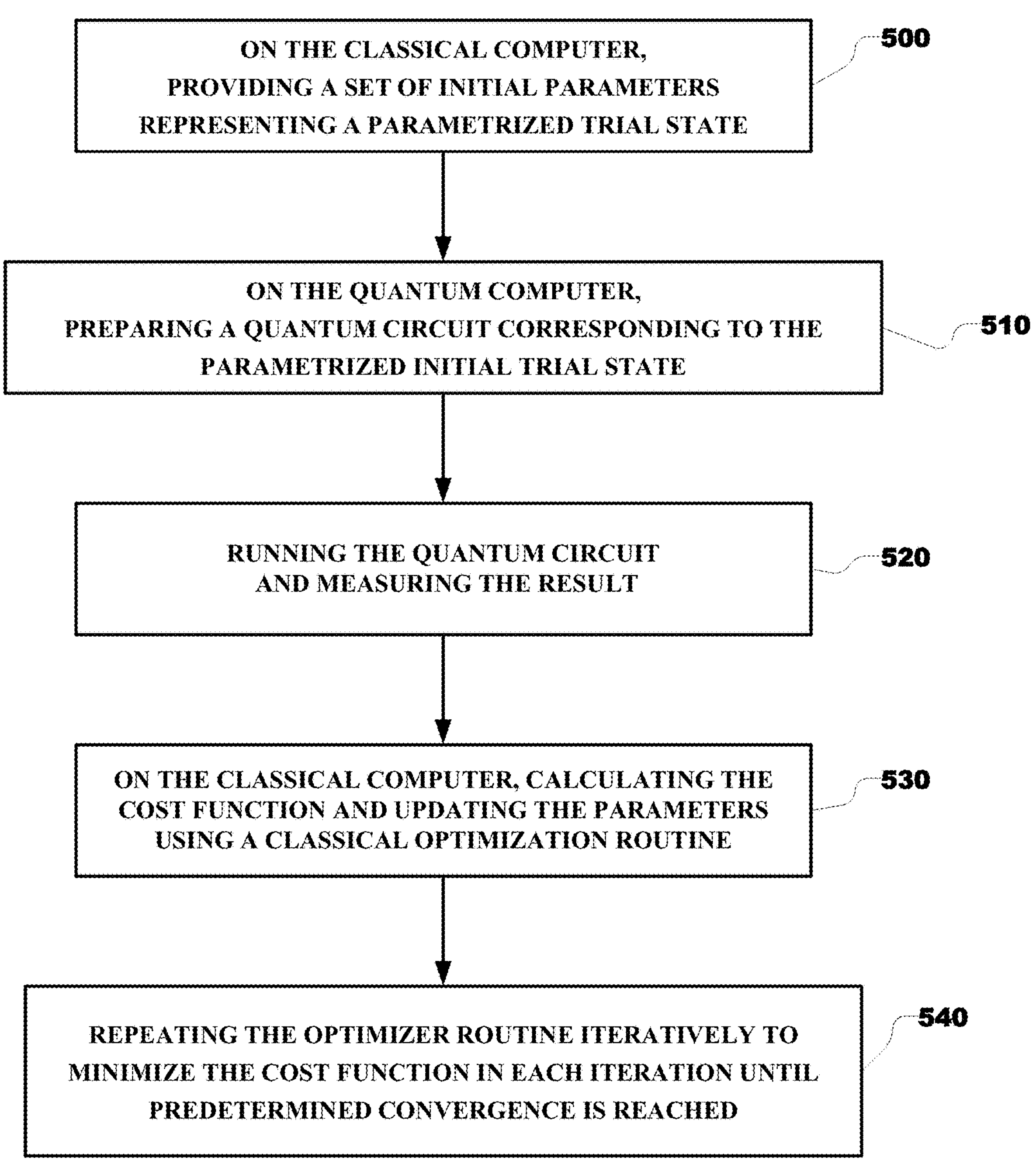
FIG. 5 is a flowchart of a method performed by the present technology, according to one embodiment of the present invention.

FIG. 5 shows a flowchart of one embodiment of the present method. In step 500, on the classical computer, the set of initial parameters representing a parametrized trial state is provided. In step 510, on the quantum computer, a quantum circuit is prepared corresponding to the parameterized additional initial trial state of step 500. In step 520, the circuit is run, and the result is measured. Next, in step 530, on the classical computer, using a classical optimization routine, the cost function is calculated, and the initial parameters of the quantum circuit are updated. In step 540, this optimizer routine is repeated iteratively to minimize the cost function in each iteration until a predetermined convergence value is reached. Using the disclosed technology, the number of iterations is dramatically reduced from conventional VQE methods, along with the run time of the algorithm. This will be discussed in what follows.

Estimating Ground State Energy

The ground state energy (as well as excited state energies) is estimated by solving the generalized eigenvalue problem:

$$\overline{H}\vec{v} = \lambda\overline{S}\vec{v}, \text{ where}$$
$$[\overline{H}]_{\alpha,\beta} = H_{\alpha,\beta} = \langle\Phi_\alpha[H]\Phi_\beta\rangle$$
$$[\overline{S}]_{\alpha,\beta} = S_{\alpha,\beta} = \langle\Phi_\alpha \mid \Phi_\beta\rangle,$$

where $\alpha$ and $\beta$ run over the states chosen to span the subspace of interest.

$S_{\alpha,\alpha}$ is equal to unity and $H_{\alpha,\alpha}$ can be determined using the estimation techniques used in conventional VQE. The remaining entries are the $S_{\alpha,\beta}$ and $H_{\alpha,\beta}$ for $\alpha \neq \beta$. To estimate these entries, let $U_\alpha$ be a unitary operator that transforms the all-zero state $|0^N\rangle$ to $|\Phi_\alpha\rangle$, i.e., $U_\alpha|0^N\rangle = |\Phi_\alpha\rangle$ where N is the number of qubits. Additionally, let $$H = \sum_\ell h_\ell$$

be a decomposition of the Hamiltonian into unitary operators h $h_\ell$. The off-diagonal entries can be expressed in terms of expectation values involving these operators:

$$H_{\alpha,\beta} = \sum_\ell \langle 0^N | U_\alpha^\dagger h_\ell U_\beta | 0^N \rangle$$
$$S_{\alpha,\beta} = \langle 0^N | U_\alpha^\dagger U_\beta | 0^N \rangle$$

Figure 6A:
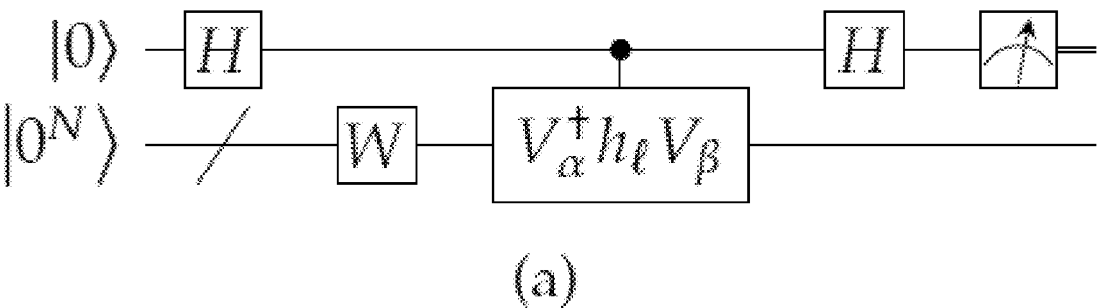
FIG. 6A and FIG. 6B illustrate the quantum circuits used to estimate the real parts with the state preparation unitaries for $|\Phi_\alpha\rangle$ and $|\Phi_\beta\rangle$.
Figure 6B:
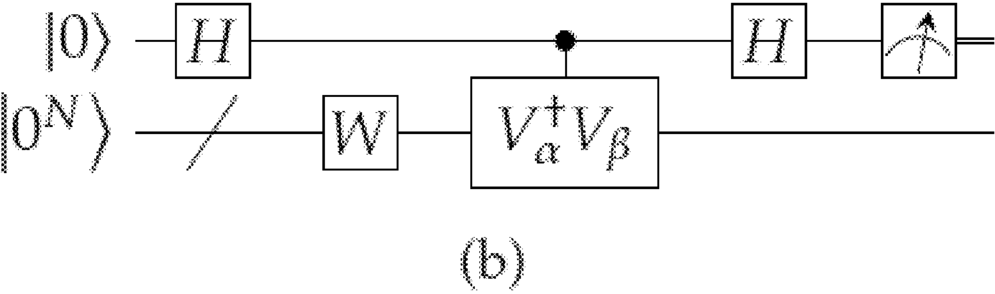

The real and imaginary parts of these expressions can be estimated using the Hadamard test. FIG. 6A and FIG. 6B illustrate the quantum circuits used to estimate the real parts with the state preparation unitaries for $|\Phi_\alpha\rangle$ and $|\Phi_\beta\rangle$ factorized as $U_\alpha = W_{\alpha,\beta}V_\alpha$ and $U_\beta = W_{\alpha,\beta}V_\beta$ to take advantage of common operations $W_{\alpha,\beta}$ at the beginning of the state preparations.

One strategy for implementing controlled versions of the ansatz operations $V_\alpha$ and $V_\beta$ is to promote each elementary gate of the original compilation into a controlled version of the gate This introduces an additional cost to the circuit in terms of depth and number of gates. Some simplifications allow for an efficient implementation of these controls for ansatzes based on particle-number conserving blocks.

Under reasonable assumptions, these simplifications allow a control to be applied to $V_\alpha$ by increasing the number of two-qubit gates by a factor of only 1+5/N, where N is the number of qubits. The outcome likelihoods of the circuits shown in FIG. 6A and FIG. 6B are $$Pr(\pm) = \frac{1}{2}\left(1 \pm \mathrm{Re}\left(\langle 0^N | U_\alpha^\dagger h_\ell U_\beta | 0^N \rangle\right)\right)$$

for the Hamiltonian entries and $$Pr(\pm) = \frac{1}{2}\left(1 \pm \mathrm{Re}\left(\langle 0^N | U_\alpha^\dagger U_\beta | 0^N \rangle\right)\right)$$

for the overlap entries.

Measurement samples give a statistical estimate of the quantities of interest Re $(\langle 0^N|U^\dagger_\alpha h h_\ell U_\beta|0^N\rangle)$ and Re $(\langle 0^N|U^\dagger_\alpha U_\beta|0^N\rangle)$. The imaginary component of the overlap can be estimated by initializing the ancilla qubit in the state $|-i\rangle|0^N\rangle$. In typical cases, estimating the imaginary components of H and S is not necessary.

This estimation, in both the real and imaginary cases, can be accelerated using quantum amplitude estimation or enhanced sampling methods.

It may be advantageous to choose some of the $\{|\Phi_\alpha\rangle\}$ basis states to be classically tractable. Here, a set of states is said to be classically tractable if $H_{\alpha,\beta}=\langle\Phi_\alpha|H|\Phi_\beta\rangle$ and $S_{\alpha,\beta}=\langle\Phi_\alpha|\Phi_\beta\rangle$ can be calculated classically for all $|\Phi_\alpha\rangle$ and $|\Phi_\beta\rangle$ in the set. Below, the states for which $H_{\alpha,\beta}$ and $S_{\alpha,\beta}$ are to be calculated classically are referred to as the "classical" states, and the remaining states in the basis as the "quantum" states.

The sensitivity of the generalized eigenvalues to errors in the entries of H and S can give insight into how such "classical boosting" might reduce the measurement and fidelity requirements. The sensitivity of a generalized eigenvalue λ to $H_{\alpha,\beta}$ and $S_{\alpha,\beta}$ is $$\frac{\partial\lambda}{\partial H_{\alpha,\beta}} = v_\alpha v_\beta(2-\delta_{\alpha,\beta}) \text{ and}$$

$$\frac{\partial\lambda}{\partial S_{\alpha,\beta}} = -\lambda v_\alpha v_\beta(2-\delta_{\alpha,\beta})$$

where v is taken to be normalized so the imaginary components of H and S are neglected, as discussed above. This asymptotic behavior shows that choosing classical states that, in linear combination may provide a good approximation of an eigenstate may greatly reduce the measurement and fidelity requirements for estimating the exact eigenvalue to within a desired accuracy.

As the classical approximation approaches the exact eigenstate, the sensitivity of the estimated energy to device and sampling error vanishes. The above approach can be implemented with a variety of choices for the quantum states and classical states. Choices for quantum states include any of the ansatzes already proposed for VQE, whose parameters could be variationally optimized to minimize the ground state energy estimated from the generalized eigenvalue problem.

The classical states may be computational basis states, which can be thought of boosting VQE with a configuration interaction calculation. In one embodiment, a single computational basis state is included. Other aspects may include matrix-product states with low bond order as well as quantum circuits inspired by a Lipkin-Meshkov-Glick model. CB-VQE can also be used in conjunction with many Hamiltonian decomposition $\{h_\ell\}$ previously proposed for VQE. In one aspect, the unitary decomposition may be conventional decomposition of H into Pauli strings. Others include the decomposition into unitary operators comprised of sets of mutually anti-commuting Pauli strings, as well as low-rank factorizations of the Hamiltonian yielding Pauli strings conjugated by orbital rotations.

Measurement Analysis of Single-Determinant Boosting

In one embodiment, the disclosed technology includes only two states, one quantum and one classically tractable, with the classically tractable state being a computational basis state. Under common encodings, a computational basis state corresponds to a single Slater determinant. The Slater determinant that provides the best approximation to the ground state is the Hartree-Fock state, and this method may be designated as HF-VQE. In this embodiment, the estimation of the eigenvalue may be simplified in this case. Deriving the relationship between the number of measurements and precision when measurements are optimally allocated to the measurement of the entries of H and S.

The overlap between $|\Phi_q\rangle$ and a given computational basis state $|i\rangle$ can be estimated using the Hadamard test as shown in FIG. 6A and FIG. 6B. In the figures, $U_{cl}$ is chosen to be an operator that transforms the $|0^N\rangle$ state to the desired computational basis state.

As the overlap α goes to unity, K approaches zero. This means that in the limit that the classically tractable state $|\Phi_{cl}\rangle$ provides a good approximation of the ground state, the number of measurements required to reach a given precision will approach zero.

In the practical implementation of classical boosting, one does not know α, E, and each $y_i$ a priori. Therefore, it is advantageous to use approximations for these quantities for the purposes of allocating measurements to the estimation of $H_{2,2}$ and each $y_i$. This is analogous to conventional VQE, where one uses approximate expectation values of each Pauli to allocate measurements to groups.

Measurement Count Reduction

FIG. 7 illustrates, in table form, the speedup provided by disclosed technology. Classical boosting numerical calculations of measurement requirements of HF-VQE are shown alongside conventional VQE for closed-shell homonuclear diatomic molecules. Four molecular species are considered: $H_2$, $Li_2$, $N_2$, and $F_2$. The estimated number of measurements to achieve a precision of 1 mHa with conventional VQE and HF-VQE is shown. The disclosed technology reduces the number of measurements required by approximately 1 to 3 orders of magnitude for these systems. The speedup, for a given molecule, is relatively consistent across the range of qubit counts considered, although some oscillations may be present.

For these conventional VQE measurement estimates, co-measurable terms were grouped. Variances in the estimators for each term were computed using the exact ground state while covariances were neglected. The measurement estimations for classically-boosted VQE corresponds to single-determinant boosting with the quantum state orthogonal to the classical state.

In another aspect, the Jordan-Wigner transformation was applied to obtain the ground state within the defined active space. This ground state was used to obtain overlaps $y_i$ as well as the term variances needed for estimating measurements for conventional VQE.

Figure 8:
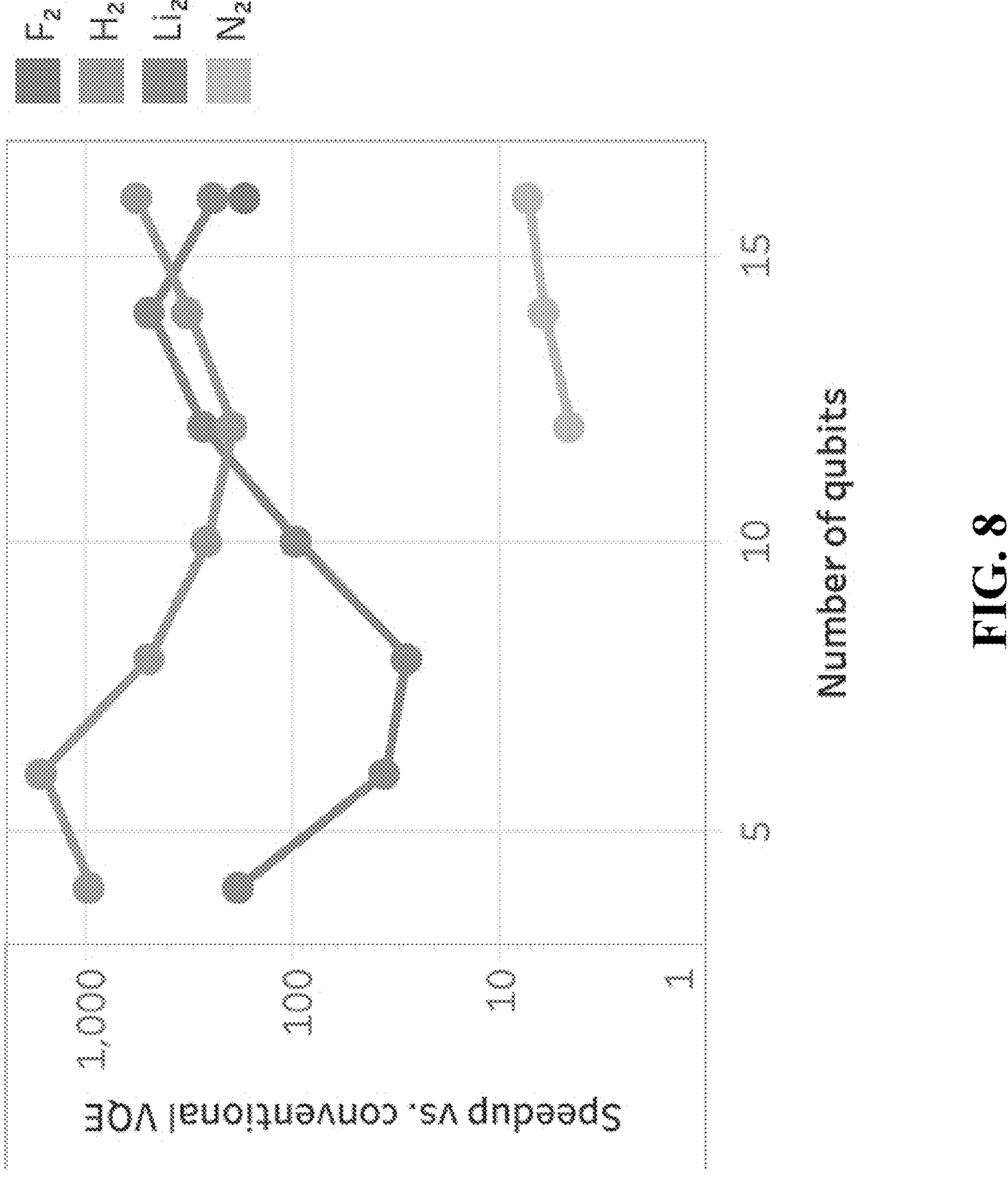
FIG. 8 is a graph showing the individual plots for $H_2$, $Li_2$, $N_2$, and $F_2$, showing the speed up numerically as a function of the number of qubits, of HF-VQE relative to conventional VQE for closed-shell homonuclear diatomic molecules.
Figure 9:
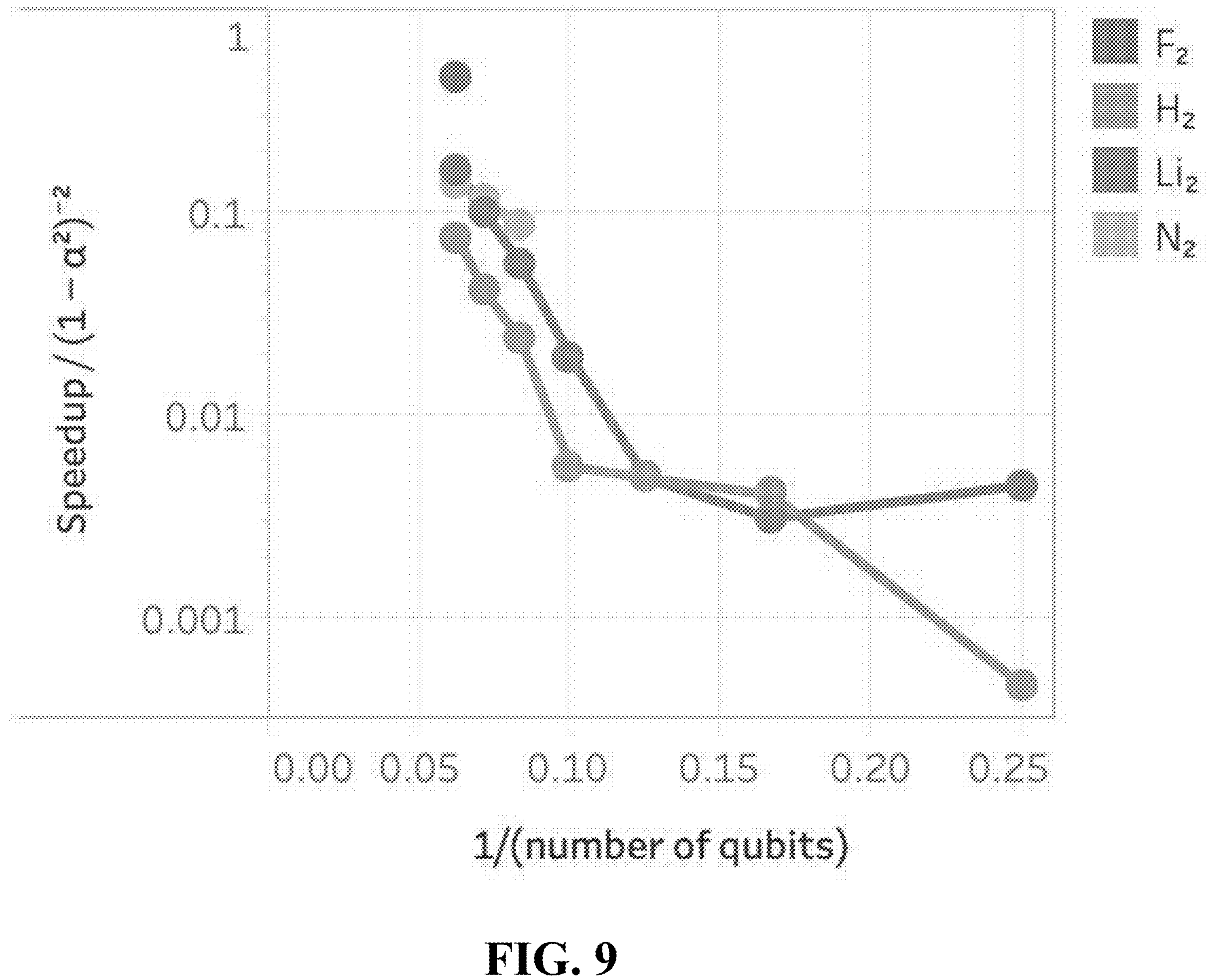
FIG. 9 is a graph showing the speedup, in terms of number of measurements, of HF-VQE relative to conventional VQE for closed-shell homonuclear diatomic molecules, relative to the speedup expected in the asymptotic limit of large basis sets.

Graphs of the speed up measurements are provided in the next figures. FIG. 8 illustrates the individual graphs for $H_2$, $Li_2$, $N_2$, and $F_2$, showing the speed up numerically as a function of the number of qubits, of HF-VQE relative to conventional VQE for closed-shell homonuclear diatomic molecules. FIG. 9 shows the speedup, in terms of number of measurements, of HF-VQE relative to conventional VQE for closed-shell homonuclear diatomic molecules, relative to the speedup expected in the asymptotic limit of large basis sets. The $S/(1-\alpha)^{-2}=1$ position on the vertical axis corresponds to expected asymptotic limit. It has been observed that data trends toward this asymptotic limit, thus providing evidence for the validity of this prediction.

Figure 10:
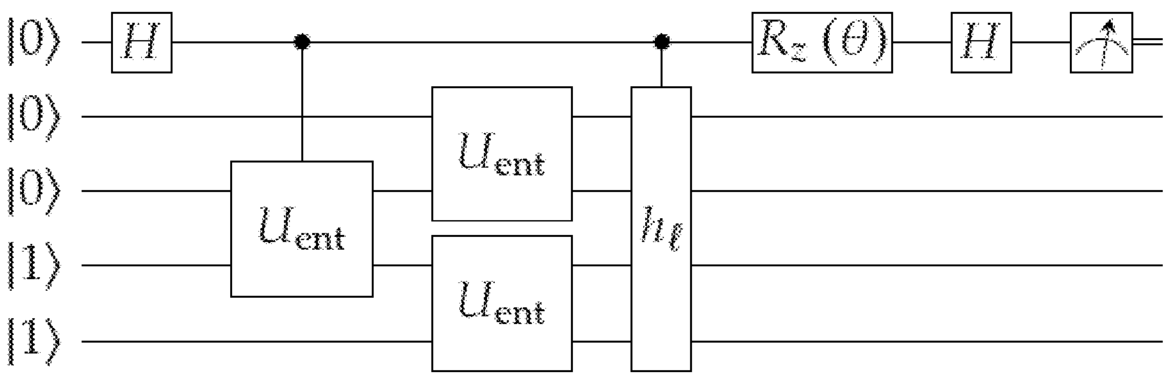
FIG. 10 illustrates a quantum circuit, where the classical state is taken from the Hartree-Fock state.

FIG. 10 shows a quantum circuit used to estimate $\langle\Phi q|H|\Phi cl\rangle$ in such a case with four spin-orbitals (in an interleaved spin-orbital ordering) and two electrons where the classical state ket$\Phi_{cl}$ is taken the Hartree-Fock state. Importantly, two of the three entangling gates Uent do not need to have controls applied. The $R_z(\theta)$ gate applies a phase to compensate for the phase that these two gates apply in the subspace where the ancilla is in the $|0\rangle$ state.

The disclosed technology uses classically-boosting VQE calculations to reduce measurement and fidelity requirements in estimating Hamiltonian eigenvalues. The derivation of this method shows that when the classically tractable states used for boosting provide a good approximation of the desired eigenstate, then the sensitivity to sampling and device error vanishes. Although the circuit depth required is in general greater than that required for conventional VQE by a constant factor, the lower sensitivity to device noise may nevertheless result in lower fidelity requirements.

Additionally, for ansatzes based on particle-number conserving blocks, classical boosting can be applied with asymptotically negligible overhead. The simplest version of classical boosting, where a single computational basis state is used to boost a single quantum state, is found to reduce the number of required measurements by a factor of 10-1000 for selected closed-shell homonuclear diatomic molecules. Furthermore, the data show that the speedup can be well approximated using only the overlap between the ground state and Hartree-Fock state.

This approximation for the speedup from single-determinant boosting can be used to estimate the effectiveness of classical boosting in accelerating calculations on systems of practical interest. A greater speedup potentially could be achieved by using a classical state (or linear combination of classical states) that incorporates electron correlation.

However, one distinguishing feature of classically-boosted variational quantum eigenstates (CB-VQE) compared to other near-term quantum algorithms for electronic structure is that it uses VQE to augment, rather than replace, classical electronic structure methods. The disclosed technology method of CB-VQE should also be able to perform at least as well as the classical methods that could be used for boosting, such as Hartree-Fock method, configuration interaction, or matrix-product state methods. The disclosed method may incorporate, and engineering likelihood functions.

In one embodiment of the disclosed technology, a method is performed on a hybrid quantum-classical computer system for computing the ground state energy of a Hamiltonian, the computer system comprising a classical computer and a quantum computer. The classical computer includes a processor, a non-transitory computer-readable medium, and computer instructions stored in the non-transitory computer-readable medium. The quantum computer includes a quantum component, having a plurality of qubits, which accepts a sequence of instructions to evolve a quantum state based on a series of quantum gates. In one aspect, computer instructions, when executed by the processor, perform a method for computing, on the hybrid quantum-classical computer, the ground state of a Hamiltonian.

The first step of the method provides, on the classical computer, a set of initial parameters representing a parametrized trial state. The second step of the method prepares a quantum circuit corresponding to the parametrized initial trial state on the quantum computer. The quantum circuit is run using the initial parameters. The result of running the quantum circuit is measured. The classical computer then calculates the cost function and updates the set of initial parameters using a classical optimizer routine to minimize the cost function. The optimizer routine is run iteratively to minimize the cost function in each iteration until predetermined convergence value is reached. An example of a commonly used classical optimization routine is the unitary coupled cluster ansatz (UCC), although others are known. The iterations of the classical optimizer routine may be minimized to achieve a predetermined balance between the iterations of the classical optimizer routine and a desired precision of the ground state energy approximation of the Hamiltonian. The classical optimizer routine may be a unitary coupled cluster ansatz (UCC).

In another aspect, the initial state of parameters represents the difference between the trial state and a classical tractable approximation to the target state. In another aspect, the classically tractable state is a single Slater determinant. In a further aspect, the initial state of parameters is selected based on a desired relationship between the number of measurements and desired precision. In some embodiments, the terms involving the quantum state is equal to unity and can be determined using the estimation techniques in conventional VQE. The overlap of computational basis states may be used or the method may be constructed so as not to contain the computational basis states. In another aspect, the total number of measurements are minimized.

In one aspect, a Hartree-Fock wave function is used to compute the ground state. In another aspect, the Hartree-Fock wave function may be pre-computed on the classical computer. In a further aspect, the Jordan-Wigner transformation may be used to compute the ground state.

In one embodiment of the disclosed technology, a method is performed on a hybrid quantum-classical computer system for computing the ground state energy of a Hamiltonian, the computer system comprising a classical computer and a quantum computer. The classical computer includes a processor, a non-transitory computer-readable medium, and computer instructions stored in the non-transitory computer-readable medium. The quantum computer includes a quantum component, having a plurality of qubits, which accepts a sequence of instructions to evolve a quantum state based on a series of quantum gates. In one aspect, computer instructions, when executed by the processor, perform a method for computing, on the hybrid quantum-classical computer, the ground state of a Hamiltonian.

The first step of the method provides, on the classical computer, a set of initial parameters representing a parametrized trial state. The second step of the method prepares a quantum circuit corresponding to the parametrized initial trial state on the quantum computer. The quantum circuit is run using the initial parameters. The result of running the quantum circuit is measured is measured. The classical computer then calculates the cost function and updates the set of initial parameters using a classical optimizer routine to minimize the cost function. The optimizer routine is run iteratively to minimize the cost function in each iteration until predetermined convergence is reached.

In another aspect the initial state of parameters represents the difference between the trial state and a classical tractable approximation to the target state. In another aspect, the classically tractable state is a single Slater determinant. In a further aspect, the initial state of parameters is selected based on a desired relationship between the number of measurements and precision. In some embodiments, the terms involving the quantum state is equal to unity and may be determined using the estimation techniques in conventional VQE. The overlap of computational basis states may be used or the method may be constructed so as not to contain the computational basis states. In another aspect, the total number of measurements are minimized.

In one aspect, a Hartree-Fock wave function used to compute the ground state. In another aspect, the Hartree-Fock wave function may be pre-computed on the classical computer. In a further aspect, the Jordan-Wigner transformation may be used to compute the ground state.

In another embodiment, the disclosed technology may be implemented as a hybrid quantum-classical computer system for computing the ground state energy of a Hamiltonian. The hybrid quantum-classical computer system includes a classical computer and a quantum computer. The classical computer includes a processor, a non-transitory computer-readable medium, and computer instructions stored in the non-transitory computer-readable medium. The quantum computer includes a quantum component, having a plurality of qubits, which accepts a sequence of instructions to evolve a quantum state based on a series of quantum gate. In operation, the computer instructions, when executed by the processor, perform a method for computing, on the hybrid quantum-classical computer, the ground state of a Hamiltonian.

The first step of the method provides, on the classical computer, a set of initial parameters representing a parametrized trial state. The second step of the method prepares a quantum circuit corresponding to the parametrized initial trial state on the quantum computer.

The quantum circuit is run using the initial parameters. The result of running the quantum circuit is measured. The classical computer then calculates the cost function and updates set of initial parameters using a classical optimizer routine to minimize the cost function. The optimizer routine is run iteratively to minimize the cost function in each iteration until predetermined convergence value is reached.

The methods described in this section and other sections for the technology disclosed can include one or more of the features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations. The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to an d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred to as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a $2^n \times 2^n$ complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled $\epsilon$). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
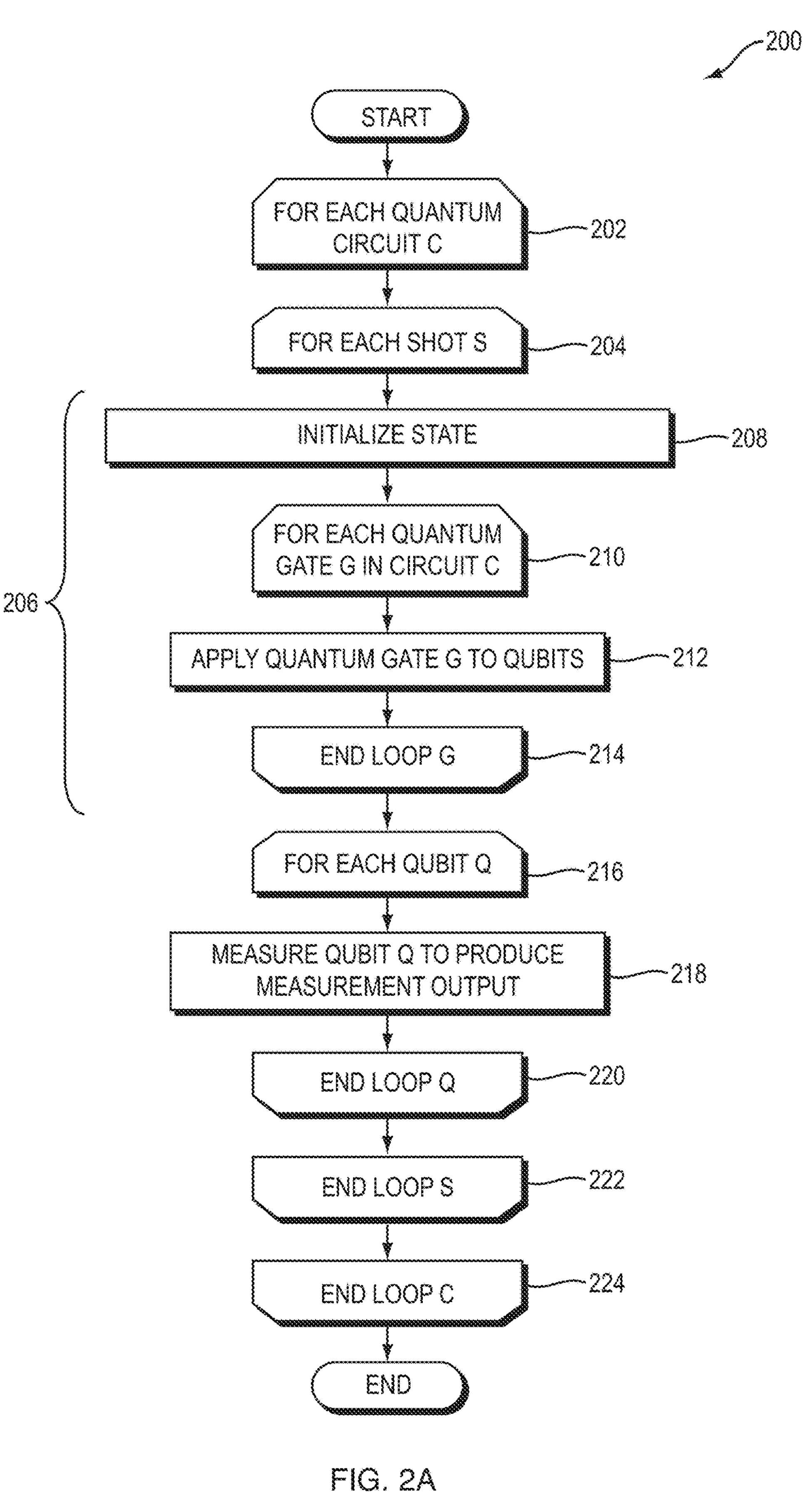
FIG. 2A is a flowchart of a method performed by the quantum computer of FIG. 1 according to one embodiment of the present invention.
Figure 2B:
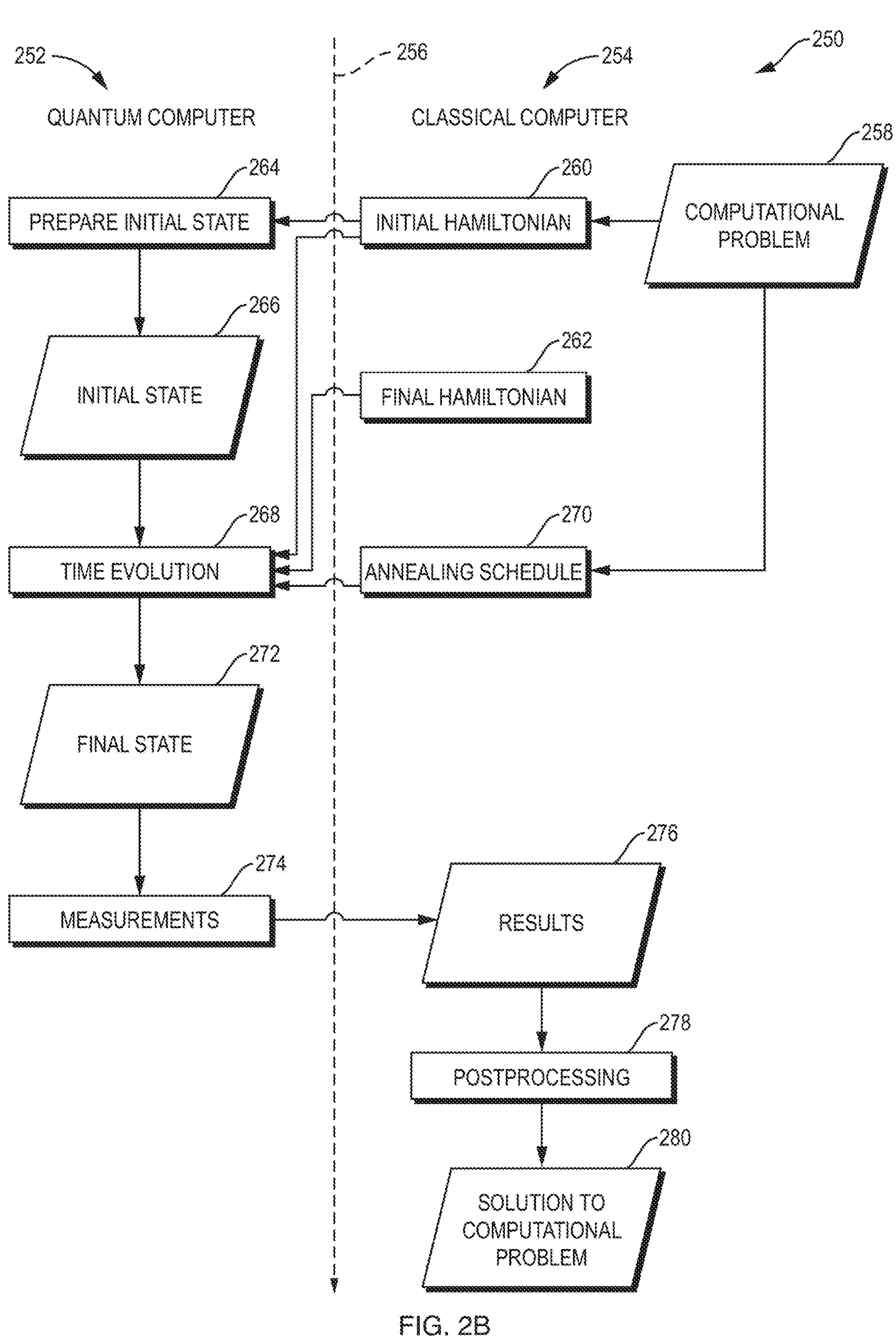
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Figure 1:
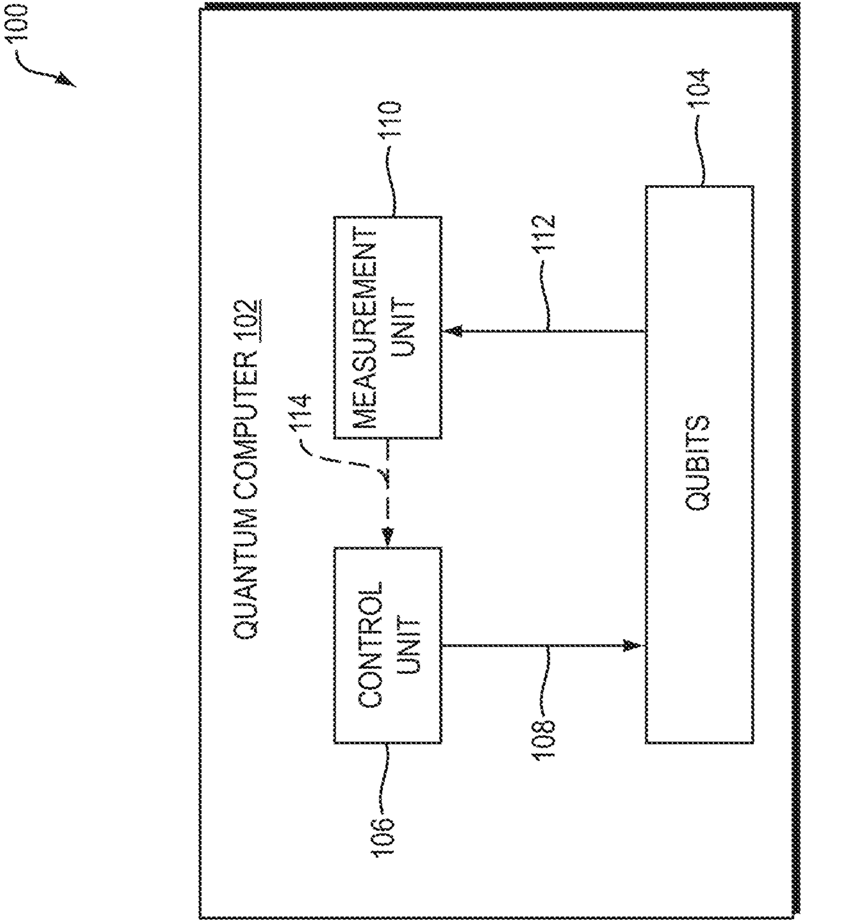
FIG. 1 is a diagram of a quantum computer according to one embodiment of the present invention.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

- In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.
- In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.
- In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout
- In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback 114 from the measurement unit 110 to the control unit 106. Such feedback 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate Gin quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
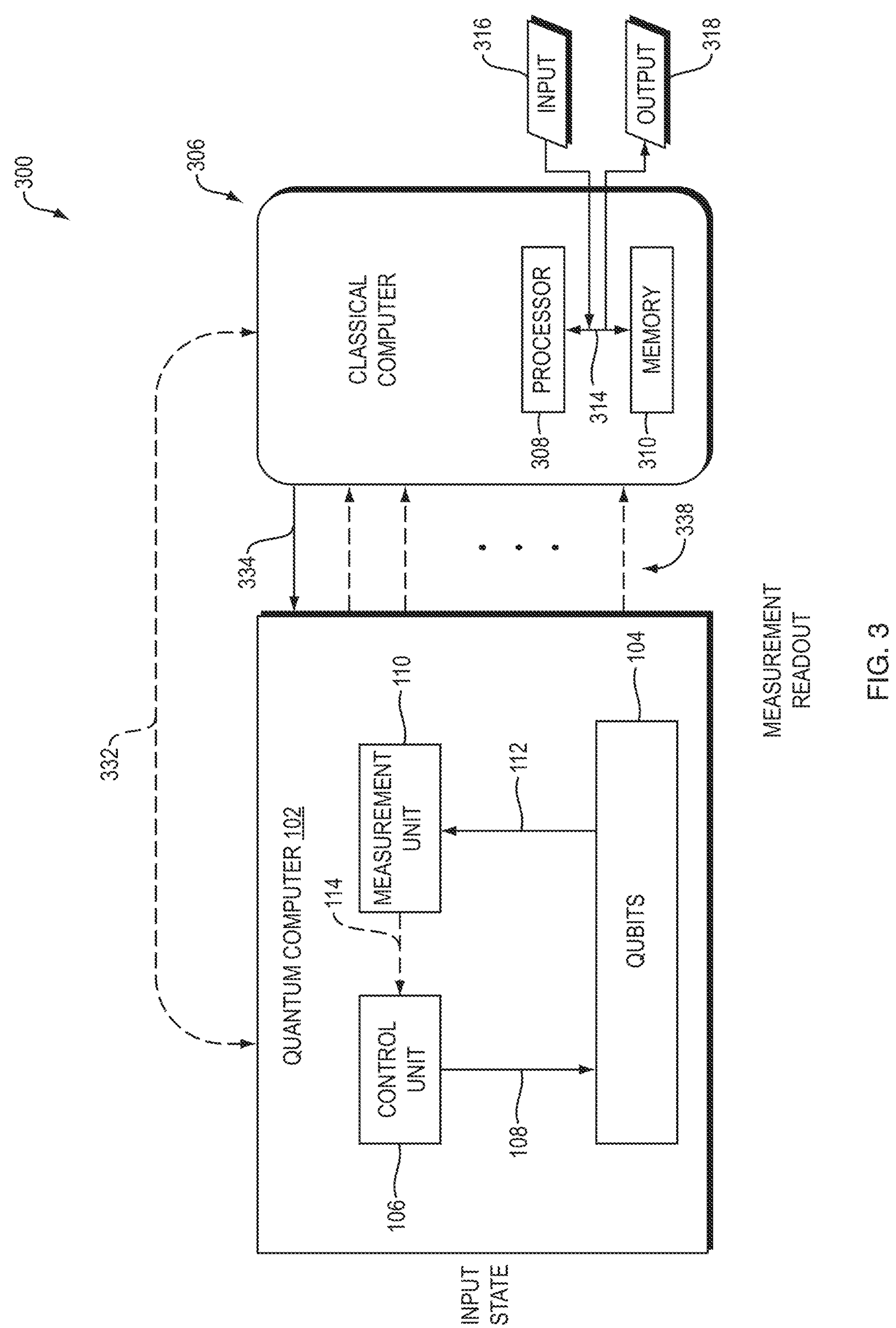
FIG. 3 is a diagram of a hybrid quantum-classical computer according to one embodiment of the present invention.

Referring to FIG. 3, a diagram is shown of a hybrid quantum classical computer (HQC) 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum classical (HQC) computer. The techniques disclosed herein may, for example, be implemented solely on a classical computer, in which the classical computer emulates the quantum computer functions disclosed herein.

Any reference herein to the state $|0\rangle$ may alternatively refer to the state $|1\rangle$, and vice versa. In other words, any role described herein for the states $|0\rangle$ and $|1\rangle$ 0 may be reversed within embodiments of the present invention. More generally, any computational basis state disclosed herein may be replaced with any suitable reference state within embodiments of the present invention.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention run quantum circuits on a quantum computer and measure the results of running the quantum circuit. Such functions can only be performed using a quantum computer, not mentally or manually. As a result, such functions are inherently rooted in computer technology.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A method, performed on a hybrid quantum-classical computer system for computing a ground state energy of a Hamiltonian, the computer system comprising a classical computer and a quantum computer, the classical computer including a processor, a non-transitory computer-readable medium, and computer instructions stored in the non-transitory computer-readable medium;

the quantum computer including a quantum component, having a plurality of qubits, which accepts a sequence of instructions to evolve a quantum state based on a series of quantum gates;

wherein the computer instructions, when executed by the processor, perform the method, the method comprising:

on the classical computer, generating a set of initial parameters representing a difference between a parametrized trial state and an approximation to a target state, wherein the approximation comprises a single Slater determinant;

preparing a quantum circuit corresponding to the difference on the quantum computer;

operating the quantum computer to measure expectation values of the Hamiltonian by evaluating the difference between the parametrized trial state and the single Slater determinant;

on the classical computer, calculating a cost function based on the expectation values and the approximation;

performing a plurality of N iterations, each of which comprises:

(1) minimizing the cost function using a using a classical optimizer routine; and (2) updating the set of initial parameters using the classical optimizer routine;

until predetermined convergence is reached to approximate the ground state energy of the Hamiltonian.

2. The method of claim 1, wherein the iterations of the classical optimizer routine are minimized to achieve a predetermined balance between the iterations of the classical optimizer routine and a desired precision of the ground state energy approximation of the Hamiltonian.

3. The method of claim 1, wherein the classical optimizer routine comprises a unitary coupled cluster ansatz (UCC).

4. A hybrid quantum-classical computer system for computing a ground state energy of a Hamiltonian, the computer system comprising a classical computer and a quantum computer, the classical computer including a processor, a non-transitory computer-readable medium, and computer instructions stored in the non-transitory computer-readable medium;

the quantum computer including a quantum component, having a plurality of qubits, which accepts a sequence of instructions to evolve a quantum state based on a series of quantum gates;

wherein the computer instructions, when executed by the processor, perform a method for computing, on the hybrid quantum-classical computer, the ground state of a Hamiltonian, the method comprising:

on the classical computer, generating a set of initial parameters representing a difference between a parametrized trial state and an approximation to a target state, wherein the approximation comprises a single Slater determinant;

preparing a quantum circuit corresponding to the difference on the quantum computer;

operating the quantum computer to measure expectation values of the Hamiltonian by evaluating the difference between the parametrized trial state and the single Slater determinant;

on the classical computer, calculating a cost function based on the expectation values and the approximation;

performing a plurality of N iterations, each of which comprises:

(1) minimizing the cost function using a using a classical optimizer routine; and (2) updating the set of initial parameters using the classical optimizer routine;

until predetermined convergence is reached to approximate the ground state energy of the Hamiltonian.

5. The hybrid quantum-classical computer system of claim 4, wherein the iterations of the classical optimizer routine are minimized to achieve a predetermined balance between the iterations of the classical optimizer routine and a desired precision of the ground state energy approximation of the Hamiltonian.

6. The hybrid quantum-classical computer system of claim 4, wherein the classical optimizer routine comprises a unitary coupled cluster ansatz (UCC).

* * * * *